(12) United States Patent
Wang et al.

(10) Patent No.: US 10,462,260 B2
(45) Date of Patent: Oct. 29, 2019

(54) CONTEXT-AWARE AND PROXIMITY-AWARE SERVICE LAYER CONNECTIVITY MANAGEMENT

(71) Applicant: Convida Wireless, LLC, Wilmington, DE (US)

(72) Inventors: Chonggang Wang, Princeton, NJ (US); Qing Li, Princeton Junction, NJ (US); Hongkun Li, Malvern, PA (US); Paul L. Russell, Jr., Pennington, NJ (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 318 days.

(21) Appl. No.: 15/114,981

(22) PCT Filed: Jan. 28, 2015

(86) PCT No.: PCT/US2015/013289
§ 371 (c)(1),
(2) Date: Jul. 28, 2016

(87) PCT Pub. No.: WO2015/116681
PCT Pub. Date: Aug. 6, 2015

(65) Prior Publication Data
US 2016/0344841 A1    Nov. 24, 2016

Related U.S. Application Data

(60) Provisional application No. 61/932,374, filed on Jan. 28, 2014.

(51) Int. Cl.
*H04W 4/70* (2018.01)
*H04L 29/08* (2006.01)
(Continued)

(52) U.S. Cl.
CPC .......... *H04L 67/327* (2013.01); *H04L 45/306* (2013.01); *H04L 67/12* (2013.01);
(Continued)

(58) Field of Classification Search
CPC ......... H04L 67/32; H04L 67/12; H04L 67/18; H04W 4/02; H04W 4/70; H04W 76/10
(Continued)

(56) References Cited

U.S. PATENT DOCUMENTS

| 9,210,645 B2 | 12/2015 | Gleixner et al. |
| 2013/0201830 A1* | 8/2013 | Wang ................. H04W 4/70 370/235 |
| 2013/0311640 A1* | 11/2013 | Gleixner ............. H04W 4/70 709/224 |

FOREIGN PATENT DOCUMENTS

| WO | WO 2013-093670 A1 | 6/2013 |
| WO | WO 2015-116681 A1 | 8/2015 |

OTHER PUBLICATIONS

3rd Generation Partnership Project ; (3GPP) TS 29.368 V11.4.0; Technical Specification Group Core Network and Terminals; Tsp Interface Protocol between the MTC Interworking Function (MTC-IWF) and Service Capabiltiy Server (SCS) (Release 11), Sep. 2013, 21 pages (Year: 2013).*

(Continued)

*Primary Examiner* — Glenford J Madamba
(74) *Attorney, Agent, or Firm* — BakerHostetler

(57) ABSTRACT

Context-aware and proximity-aware service layer connectivity management may leverage context information and connectivity service policies to dynamically determine and adjust appropriate service layer connectivity for machine-to-machine or Internet of things entities.

16 Claims, 16 Drawing Sheets

(51) Int. Cl.
  *H04W 76/10* (2018.01)
  *H04L 12/725* (2013.01)
  *H04W 4/02* (2018.01)
(52) U.S. Cl.
  CPC .............. *H04L 67/18* (2013.01); *H04W 4/025* (2013.01); *H04W 4/70* (2018.02); *H04W 76/10* (2018.02); *H04W 4/023* (2013.01)
(58) Field of Classification Search
  USPC ........................................................ 709/228
  See application file for complete search history.

(56) References Cited

OTHER PUBLICATIONS

3rd Generation Partnership Project; (3GPP) TS 23.271, V12.0.0, Technical Specification Group Services and System Aspects;; Functional Stage 2 Description of Location Services {LCS} (Release 12), Dec. 2013, 169 pages (Year: 2013).*

European Telecommunications Standards Institute (ETSI), TS 102 690 V 2.1.1, "Machine-to-Machine Communications (M2M; Functional Architecture", Oct. 2013, 168 pages (Year: 2013).*

International Application No. PCT/US2015/013289: International Search Report and Written Opinion dated Apr. 17, 2015, 10 pages.

IEEE P802.15 "Peer Aware Communications (PAC) Study Group 5 Criteria", Working Group for Wireless Personal Area Networks (WPANs), Jan. 2012, 4 pages.

European Telecommunications Standards Institute (ETSI), TS 102 690 V 2.1.1, "Machine-to-Machine Communications (M2M; Functional Architecture", Oct. 2013, 168 pages.

OneM2M "Functional Architecture", TS-0001, V0.0.6, Aug. 20, 2013, 47 pages.

3rd Generation Partnership Project; (3GPP) TS 23.002, V12.3.0, 3rd Generation Partnership Project; Technical Specification Group Services and System Aspects; Network architecture (Release 12), Dec. 2013, 105 pages.

3rd Generation Partnership Project; (3GPP) TS 23.271, V12.0.0, 3rd Generation Partnership Project; Technical Specification Group Services and System Aspects; Functional stage 2 description of Location Services (LCS) (Release 12), Dec. 2013, 169 pages.

3rd Generation Partnership Project; (3GPP) TS 29.368 V11.4.0, 3rd Generation Partnership Project; Technical Specification Group Core Network and Terminals; Tsp interface protocol between the MTC Interworking Function (MTC-IWF) and Service Capability Server (SCS) (Release 11), Sep. 2013, 21 pages.

* cited by examiner

CONTEXT-AWARE AND PROXIMITY-AWARE SERVICE LAYER CONNECTIVITY MANAGEMENT

CROSS-REFERENCE TO RELATED APPLICATIONS

This application is a National Stage Application filed under 35 U.S.C. 371 of International Application No. PCT/US2015/013289, filed Jan. 28, 2015, which claims the benefit of U.S. Provisional Patent Application No. 61/932,374, filed on Jan. 28, 2014, entitled 'CONTEXT-AWARE AND PROXIMITY-AWARE SERVICE LAYER CONNECTIVITY MANAGEMENT," the contents of which are hereby incorporated by reference herein.

BACKGROUND

Machine-to-Machine (M2M) Communication is a form of data communication between entities that, when deployed, do not necessarily require direct human interaction. One challenge of M2M Communication is establishing a protocol so that that deployed equipment may be managed efficiently.

M2M technologies have enabled various applications in different areas such as system status monitoring, automatic energy metering, home automation, wireless monitoring in intelligent buildings, personal area networks, monitoring of parameters, positioning, and real time location in medical technology, among other things.

SUMMARY

Disclosed herein are methods, devices, and systems for context-aware and proximity-aware service layer connectivity management (CAPA). CAPA leverages context information (e.g. proximity context including link-layer connectivity information, entity context, network context, etc.) and connectivity service policies to dynamically determine and adjust appropriate service layer connectivity for machine-to-machine (M2M) or Internet of things (IoT) entities (e.g. M2M devices, gateways, servers, and applications). In an example, there may be methods for context-aware and proximity-aware service layer connection adjustment, which dynamically adjusts established connections based on context information and connectivity service policy. Resources and architecture options for implementing CAPA functionalities are disclosed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EXAMPLES

Context-aware and proximity-aware (CAPA) service layer connectivity management leverages context information (e.g., proximity context, entity context, network context, etc.) and connectivity service policies to dynamically determine and adjust appropriate service layer connectivity for two or more machine-to-machine (M2M) or Internet of things (IoT) entities (e.g. M2M devices, gateways, servers, or applications). In an example, which is described in more detail herein, there may be methods for context-aware and proximity-aware service layer connection adjustment, which dynamically adjusts established connections based on context information and connectivity service policy. Potential communication preferences that may be taken into account for service layer connectivity management include information regarding whether to communicate over intermediary nodes (e.g., direct service layer and/or direct link layer) and what type of intermediary nodes to communicate over (e.g., link layer or server).

A service layer is a protocol layer between the application layer and the application/transport protocol layer. For example, the European Telecommunications Standards Institute machine-to-machine (ETSI M2M) and oneM2M specifications define an M2M service layer, which stays on top of application protocols (e.g., hypertext transfer protocol (HTTP), constrained application protocol (CoAP), eXtensible messaging and presence protocol (XMPP), message queuing telemetry transport (MQTT), etc.). Basically, the service layer connects M2M entities that may be one-hop or multiple hops away from each other. As discussed herein, service layer connectivity is defined as the capability to connect a source entity and destination entities, which may or may not include service layer intermediary entities between destination entities. A pair of source and destination entities may have multiple service layer connections, for example, to support different applications or services. A service layer entity (e.g., source, destination, or intermediary) could be an M2M application (e.g., Application entity (AE) in oneM2M; device application (DA), gateway application (GA), or network application (NA) in ETSI technical committee (TC) M2M), or an M2M device/gateway/server (i.e. Common service entity (CSE) in oneM2M, service capability layer (SCL) in ETSI TC M2M).

Figure 1A:
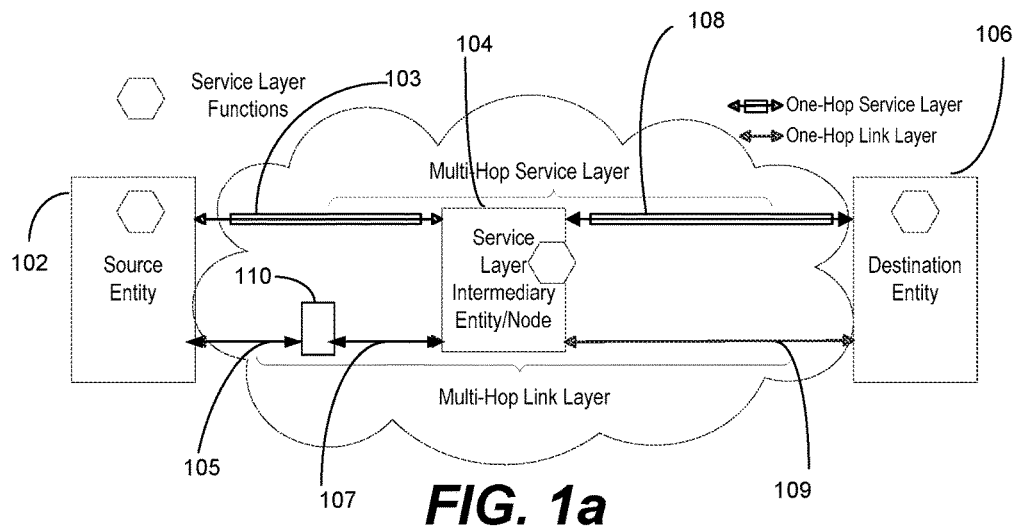
FIG. 1A illustrates an exemplary service layer communication scenario with an intermediary node.
Figure 1B:
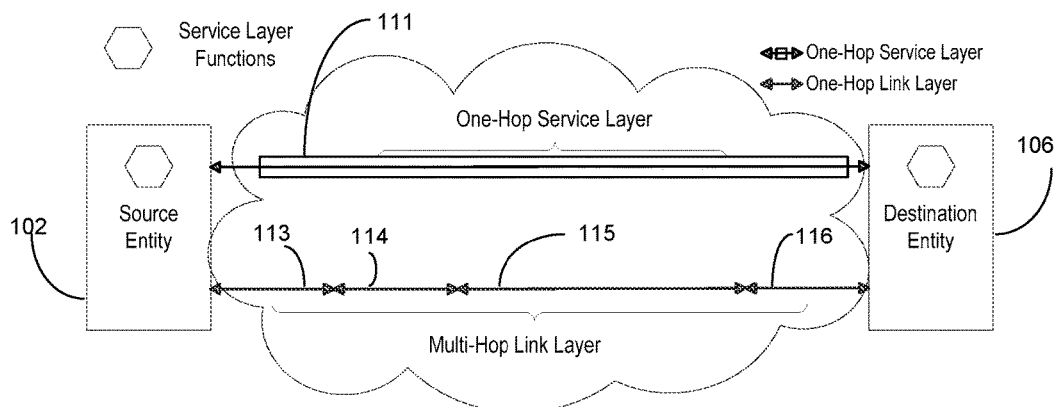
FIG. 1B illustrates an exemplary service layer communication scenario with multi-hop link layer and one-hop service layer.
Figure 1C:
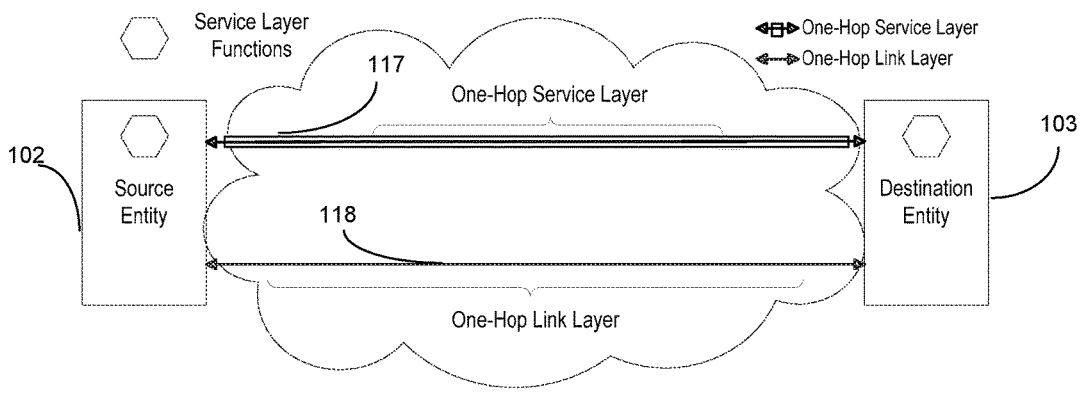
FIG. 1C illustrates an exemplary service layer communication scenario one-hop link layer and one-hop service layer.

There are multiple potential communication modes at the service layer as illustrated by FIG. 1A, FIG. 1B, and FIG. 1C. FIG. 1A illustrates an exemplary service layer communication scenario with an intermediary node (herein Type 1-indirect service layer communications). In FIG. 1A, source entity 102 communicates with destination entity 106 through service layer intermediary entity 104. As shown, the service layer has service layer communication 103 between source entity 102 and service layer intermediary entity 104 and service layer communication 108 between service layer intermediary entity 104 and destination entity 106. With regard to the link layer as shown in FIG. 1A there may be multiple hops between nodes. Link layer communication 105 may between node 110 and source entity 102 and link layer communication 107 may be between node 110 and service layer intermediary entity 104. Link layer communication 109 may be between service layer intermediary entity 104 and destination entity 106. Indirect service layer communications, as shown in FIG. 1A, include service layer intermediary nodes or entities in the middle of communicating entities (e.g., source entity 102 and destination entity 106) to assist end-to-end communications.

As shown in FIG. 1A, service layer intermediary entity 104 may be involved in indirect service layer communications. There are multiple use cases for indirect service layer communications. For example, ETSI TC M2M service architecture (as shown in ETSI TC M2M TS 102 690 Functional architecture) follows indirect service layer communications where an M2M server is the service intermediary node and communications between two M2M devices needs to go through the M2M server even if they have direct link available. In Type-1 indirect service layer communications may cause extra overhead at the intermediary entity/node and latency due to the relaying or proxying at the intermediary entity/node, but it may be more secure and efficient for supporting one-device-to-multiple-device multicast communications. Also, service layer caching in this mode may help to reduce end-to-end (E2E) delay at some degree.

FIG. 1B illustrates an exemplary service layer communication scenario with multi-hop link layer and one-hop service layer. In FIG. 1B, source entity 102 communicates with destination entity 106 with service layer communication 111 and there is no intermediary service layer entity. Underlying service layer communication 111 are multiple link layer communications, such as link layer communication 113, link layer communication 114, link layer communication 115, and link layer communication 116. The link layer entities (not shown) that provide the multi-hop link layer scenario between source entity 102 and destination entity 106, may not provide service-layer functions for the communication between the source entity and destination entity. Direct Service Layer Communications without Direct Link (Type 2), as shown in FIG. 1B, have communicating entities do not have a direct link between them. For example, two Machine-Type Communication (MTC) devices located in different cellular cells may talk to each other without being routed through an MTC server. In another example, two M2M/Internet of Things (IoT) gateways may talk to each other without being relayed by an M2M/IoT server.

In Type-2 direct service layer communications, there is a direct (i.e., one-hop) service-layer connectivity, but indirect (i.e. multi-hop) link-layer connectivity between communicating entities. For example, two M2M/IoT devices located in different places/domains may talk to each other directly at service layer instead of being relayed by an M2M/IoT server as defined in ETSI TC M2M. Multi-hop D2D communications as defined in IEEE 802.15.8 Peer-Aware Communications belong to Type-2 direct service layer communications, for example. Type-2 direct service layer communications may reduce service-layer latency and overhead in contrast to indirect service layer communications, but it still relies on multi-hop link-layer connectivity, which may cause long end-to-end latency in some situations.

FIG. 1C illustrates an exemplary service layer communication scenario one-hop link layer and one-hop service layer. Between source entity 102 and destination entity 103 there is service layer communication 117 and underlying link layer communication 118. Direct Service Layer Communications with Direct Link (Type-3), as shown in FIG. 1C, direct link between communicating entities and accordingly they directly talk to each other in both service layer and link layer. In an example, two MTC devices within the same cellular cell and each other's radio coverage can directly talk using a one-hop direct link without going to an MTC sever their base station. In another example, two smart phones as IoT devices located in the same room may talk to each other via one-hop direct radio link and do not need help from the base station or M2M/IoT server in the cloud.

In Type-3 direct service layer communications, there is both direct (e.g., one-hop) service-layer connectivity and direct (e.g., one-hop) link-layer connectivity between communicating entities. For example, two smart phones within proximity can talk to each other based on D2D communications. One-hop D2D communications as defined in IEEE 802.15.8 Peer-Aware Communications (incorporated herein by reference) belong to Type-3 direct service layer communications, for example. Type-3 direct service layer communications may achieve the shortest latency since it can exploit one-hop direct transmission at both link layer and service layer, but one-hop direct transmission may have potential security and reliability issue due to lack of service layer control by an M2M server, for example.

The types of service layer communication scenarios discussed herein show different features in service layer connectivity and lower layer connectivity. Table 1 shows the comparison among three exemplary service layer communication scenarios or modes and possible positives and possible negatives.

TABLE 1

Comparison between Service Layer Communications

| Modes | Service Layer Connectivity | Link Layer Connectivity | Possible Positives | Possible Negatives |
|---|---|---|---|---|
| Type-1: Indirect Service Layer Communications | Indirect (Multi-Hop) | Indirect (Multi-Hop) | Controllability Multicast support Security control | Long latency Overhead at service layer intermediary entities |
| Type-2: Direct Service Layer Communications without Direct Link | Direct (One-Hop) | Indirect (Multi-Hop) | Reduced Latency No overhead at service layer intermediary entities | Communication overhead due to indirect link Controllability |
| Type-3: Direct Service Layer Communications with Direct Link | Direct (One-Hop) | Direct (One-Hop) | High transmission Efficiency Low latency Security No Overhead at service layer intermediary entities | Controllability Flexibility Reliability due to the lack of control and/or assistance from other service layer nodes. |

Table 2 lists potential conditions that may be leveraged to enable different communication modes in terms of link layer connectivity and service layer connectivity. As may be implied by Table 2, if two communicating entities only have indirect link-layer connectivity, Type-1 and Type-2 may be enabled. If two communicating entities only have direct link-layer connectivity, only Type-3 direct may be enabled. If two communicating entities have both indirect and direct link-layer connectivity, all three service layer communication modes may be enabled. The service layer communication modes may be different for different applications operating on the same device. Simultaneous operation of multiple modes may occur (e.g., Type-3 for a first application and Type-2 for a second application).

TABLE 2

Conditions for Indirect Service layer communications and Direct Service layer communications

| Condition | Indirect Service Layer Connectivity | Direct Service Layer Connectivity |
|---|---|---|
| Indirect Link Layer Connectivity | Type-1: Indirect Service Layer Communications | Type-2: Direct Service Layer Communications without Direct Link |
| Direct Link Layer Connectivity | N/A | Type-3: Direct Service Layer Communications with Direct Link |

Figure 2:
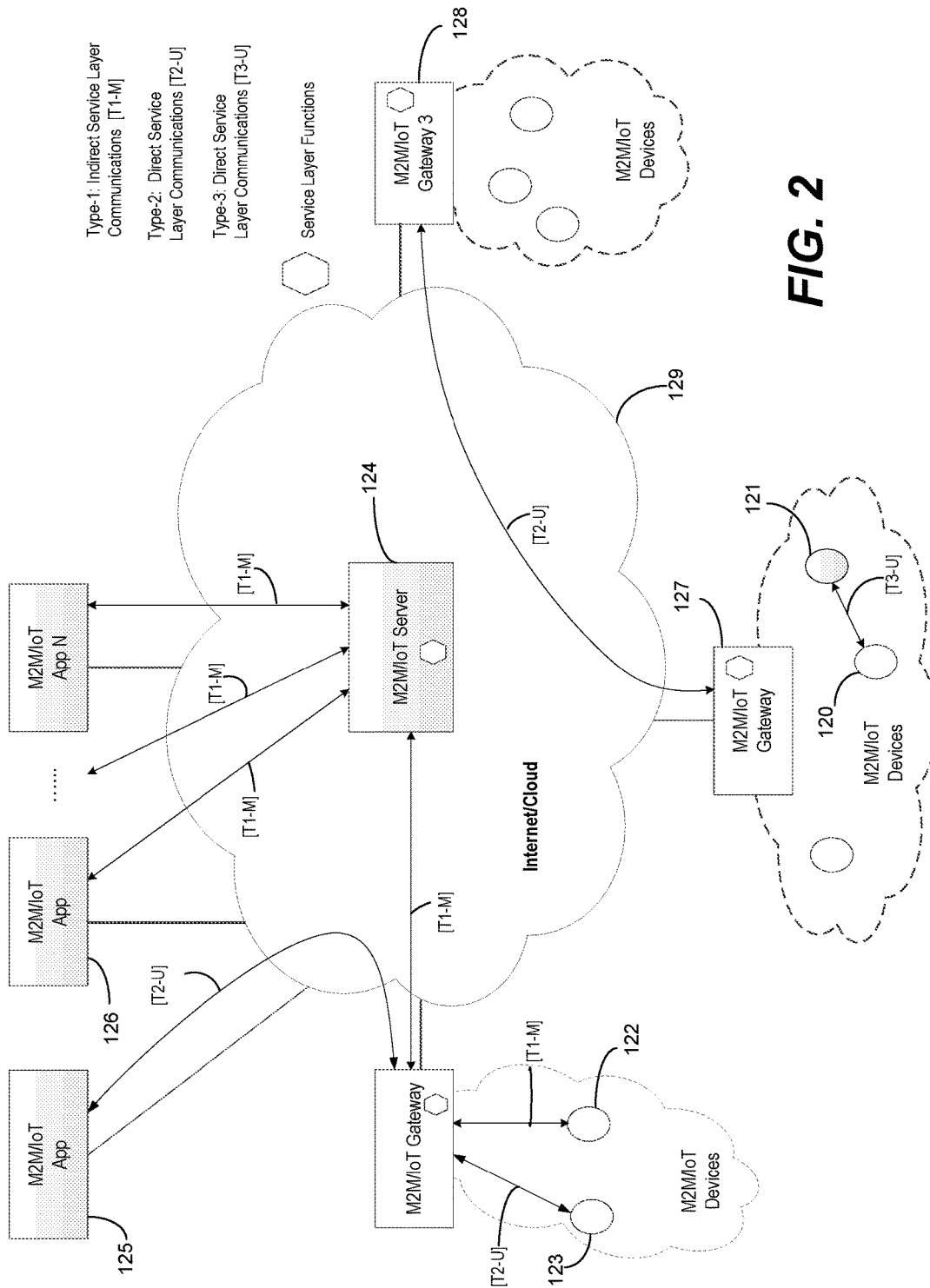
FIG. 2 illustrates examples of different service layer communication modes.

FIG. 2 illustrates several examples of service layer communication modes. In FIG. 2, for Type-1 Indirect Service layer communications, the traffic flow from M2M/IoT device 122 to M2M/IoT application (App) 126 to M2M/IoT application N is routed via M2M/IoT server 124. In this case, M2M/IoT server 124 can multicast data to M2M/IoT App 126 to M2M/IoT App N. For Type-2 Direct Service layer communications, the traffic flows between M2M/IoT device 123 and M2M/IoT App 125 and the traffic flow between M2M/IoT gateway 127 and gateway 128. For Type-3 Direct Service layer communications, the traffic flows between M2M/IoT device 120 and M2M/IoT device 121. If the communication modes are provisioned or statically configured, several problems may occur, such as application performance and link/network resource utilization. For example, if all M2M devices of FIG. 2 had to go through the M2M/IoT server 124 for communicating with each other, M2M server could become congested. In another example, there may be a situation where the communication of M2M device 120 and M2M device 121 through M2M gateway 127 may negatively affect resource (e.g., memory) utilization of M2M gateway 127 or network link to Internet 129.

As discussed herein, analyzing and automatically directing devices to appropriate options for service layer connectivity may be beneficial. It may be beneficial to select connection options that utilize network resources to achieve certain efficiencies. Service layer connectivity may be impacted by service layer requirements, instantaneous context information about links, instantaneous context information about end-entities, certain policies, etc.

As discussed herein, CAPA may leverage context information (e.g., proximity context including link-layer connectivity information, entity context, network context, etc.) and connectivity service policies to dynamically determine and adjust appropriate service layer connectivity for M2M/IoT entities (e.g., M2M devices, gateways, servers, and applications). CAPA manages service layer connectivity and may leverage information about link-layer connectivity from underlying networks via different interfaces. The leveraged interfaces may include oneM2M Z interface (oneM2M-TS-0001 oneM2M Functional Architecture-V-0.2.2, November 2013, incorporated herein by reference), 3GPP Le interface (3GPP TS 23.002, incorporated herein by reference; Technical Specification Group Services and Systems Aspects; Network architecture), or 3GPP Tsp interface (3GPP TS 29.368; Tsp interface protocol between the MTC Interworking Function (MTC-IWF) and Service Capability Server (SCS)).

CAPA examples are discussed in more detail herein. In an example, there may be CAPA service layer connection establishment, which establishes appropriate service layer connections for communication between IoT entities based on various context information (e.g., entity context information, network context information, proximity context information, and connectivity requirement) and provisioned, but re-configurable, connectivity service policies. In an example, there may be context-aware and proximity-aware service layer connection adjustment, which dynamically adjusts established connections based on context information and connectivity service policy. In an example, there may be context-aware and proximity-aware service layer connection cancellation, which may dynamically cancel established connections based on different context information. In an example, there may be dynamic connectivity service policy management, which allows connectivity service policies to be dynamically managed and manipulated. In an example, there may be CAPA functionalities with integrated connection establishment, connection adjustment, connection cancellation, and connectivity service policy management. In an example, there may be resources and architecture options for implementing CAPA functionalities in oneM2M. In an example, CAPA may be implemented as a new oneM2M common service function (CSF).

Figure 3:
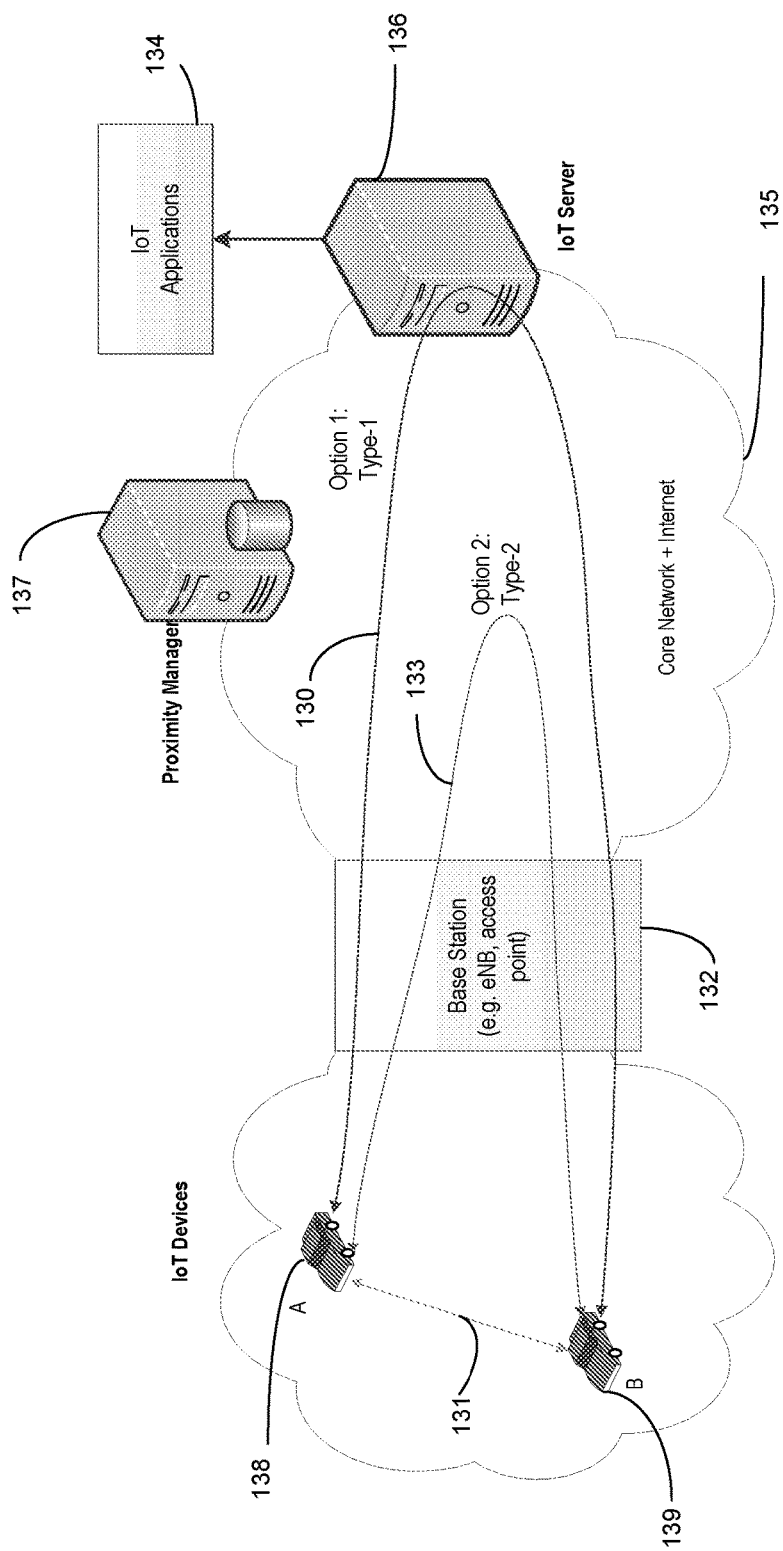
FIG. 3 illustrates an example use case for service layer connectivity management.

FIG. 3 illustrates a use case that utilizes service layer connectivity management. In this use case, there are two IoT devices, IoT device 138 and IoT device 139. The IoT devices may be vehicles that can communicate via an in intelligent transportation system integrated or otherwise coupled with the vehicles. Proximity manager 137 may maintain location information of IoT device 138, IoT device 139, as well as other devices. As shown, in FIG. 3, there are multiple options for IoT device 138 and IoT device 139 to communicate with each other. The options for service layer connectivity may be managed in a way to optimize communication efficiency between IoT device 138 and IoT device 139 and system performance, given the constraints or requirements from the network, IoT devices, and applications running over the IoT devices. An individual application may have time-dependent requirement.

A first exemplary option may be for IoT device 138 and IoT device 139 to communicate via service layer communication link 130. Service layer communication link 130 (considered Type-1) may go through base station 132 and IoT server 136. IoT server 136 may include IoT applications 136. A second exemplary option may be to communicate via service layer communication link 133. Service layer communication link 133 may go through base station 132 into core network 135, but bypass IoT server 136. In a third exemplary option may be to communicate via service layer communication link 131. Service layer communication link 131 may be a direct link between IoT device 138 and IoT device 139 that bypasses base station 132, core network 135, and IoT server 136. For FIG. 3, service layer communication modes may be dynamically adjusted based on application requirements or other service layer entity. Multiple modes may be enabled simultaneously.

FIG. 3 illustrates an exemplary scenario where two stand-alone devices (e.g., IoT device 138 and IoT device 139) connect with IoT server 136. Other scenarios include examples such as, 1) service layer connectivity management for constrained devices behind an IoT gateway and 2) service layer connectivity management between a network application and a device application that may cross multiple IoT servers and gateways. Another exemplary use case (not shown) may include a smart home where various home devices are deployed together with a home gateway. The communications between home devices may happen directly (e.g., bypassing the home gateway) or indirectly (e.g., relayed by the home gateway). The home gateway may dynamically establish appropriate service layer connectivity for those home devices, which could be resource-constrained (e.g., light switches, motion sensors) or non-resource-constrained (e.g. Internet Protocol (IP) camera).

Figure 4:
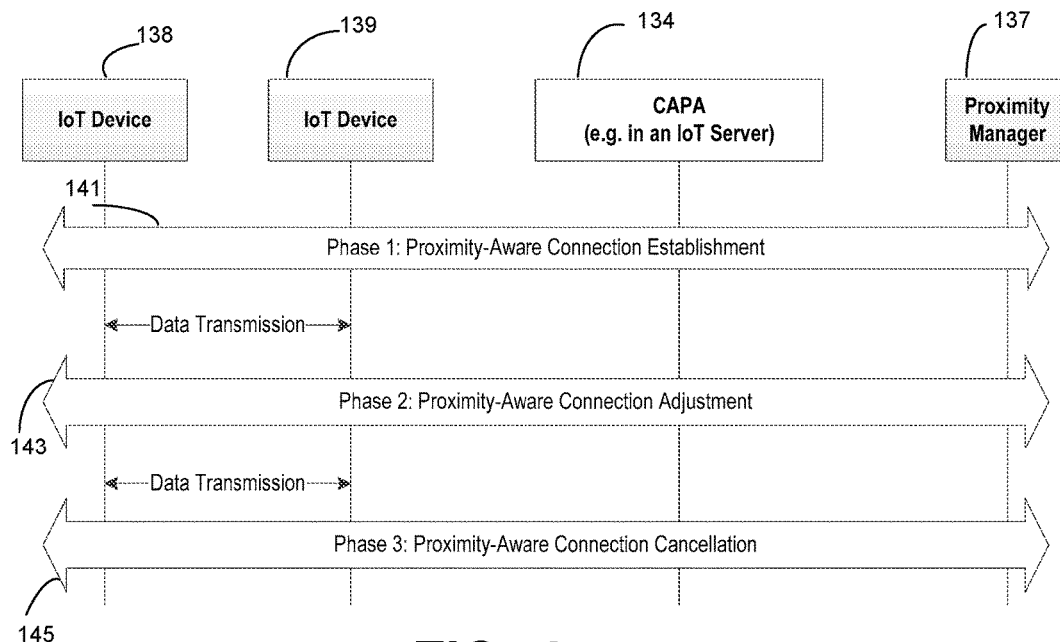
FIG. 4 illustrates a method for Context-Aware and Proximity-Aware Service Layer Connectivity Management.

Discussed herein are CAPA procedures and interactions with IoT entities. For example, details on how CAPA dynamically manages service layer connectivity among different IoT entities and how connectivity service policies are dynamically managed. FIG. 4 illustrates an exemplary approach that includes connection establishment, connection adjustment, and connection cancellation. The established connections may be used for a data path or a control path between two IoT entities. FIG. 4 includes entities that may take part in the proposed CAPA service layer connectivity management, such as IoT device 138 (e.g., an MTC device), IoT device 139 (e.g., an MTC device), CAPA 134 (e.g., operating on IoT server 136), or proximity manager 137.

In the CAPA connection establishment phase 141, a service layer connection is established for multiple IoT entities (e.g., IoT device 138 and IoT device 139) by CAPA 134. As discussed in more detail herein, CAPA 134 may make the decision based on request and indication from IoT entities and their proximity information as provided by proximity manager 137. The established connections may be in one of the service-layer communication modes discussed herein. Since an IoT entity may support more than one application, CAPA 134 may establish a separate service layer connection for each individual applications or a single connection for multiple applications. In the CAPA connection adjustment phase 143, CAPA 134 adjusts the connectivity (e.g., an established connection) between communicating IoT device 138 and IoT device 139 based on their new context information. CAPA 134 may change the properties of an established connectivity, for example, from one communication mode to another. In the CAPA connection cancellation phase 145, an existing connection is cancelled.

In addition, CAPA 134 includes connectivity service policy management procedure to dynamically manage connectivity service policies, which may happen before or after any one of the CAPA 134 connection phases.

Figure 5:
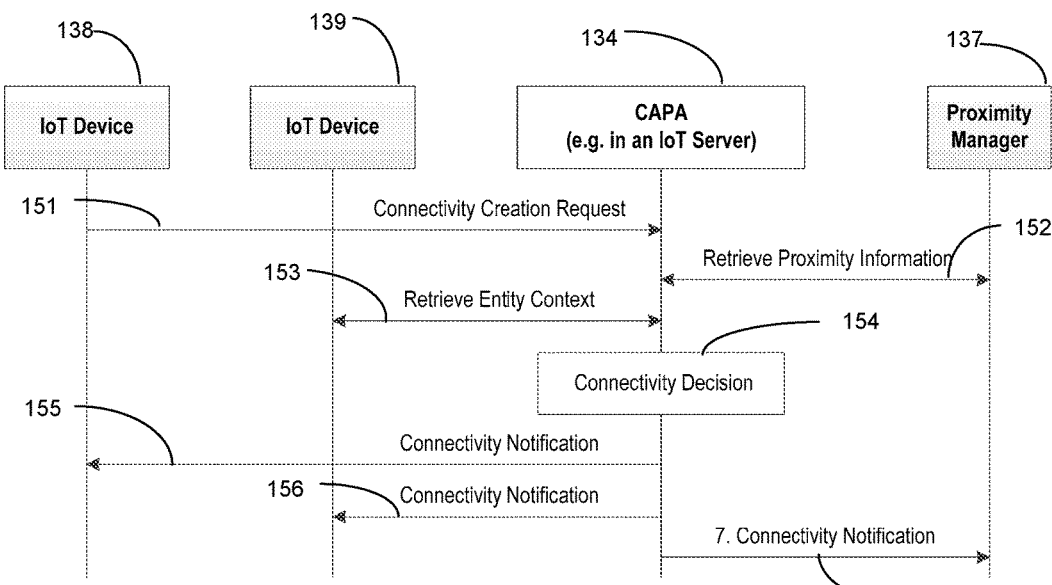
FIG. 5 illustrates an exemplary connection establishment method.

FIG. 5 illustrates an exemplary connection establishment method. At step 151, IoT device 138 sends a "connection creation request" message to CAPA 134 to request to establish a service layer connection with IoT device 139. IoT device 138 may use one message to request multiple connections with IoT device 139 or include another IoT device. The connection creation request message may contain information (e.g., parameters with regard to context information of IoT device 138). Some examples of context information are listed in Table 3. In a scenario, CAPA 134 may maintain the context information of IoT device 138, which in turn does not have to be included in the request message of step 151. In addition, the location information of IoT device 138 may not be included in this message, but CAPA may obtain it from proximity manager 137 (e.g., an access network interface such as a Le or Tsp interface with a 3GPP access network). Table 3 lists both source preference and destination preference, which may be leveraged to establish uni-directional connection. Bi-directional connection is utilized for a pair of IoT entities in most cases and accordingly source preference and destination preference may often be the same. Possible solutions for leveraging source preference and destination preference are listed in Table 4, where the "V" mark shows the feasibility of considering a specific source preference and a specific destination preference. Table 5 includes exemplary parameters that may assist in the establishment of the connection.

At step 152, CAPA 134 contacts proximity manager 137 to retrieve proximity information about IoT device 138 and its destination (e.g., IoT device 139). Proximity manager 137 may be standalone or integrated into another device, such as IoT server 136. The proximity information may include the current location of IoT device 138 and IoT device 139, if IoT device 138 and IoT device 139 are in proximity, or if IoT device 138 and IoT device 139 have direct link established in the underlying networks. If IoT device 138 and IoT device 139 are in proximity, but have no direct link established, CAPA 134 may inform proximity manager 137 to trigger the establishment of direct link for them. IoT entities such as IoT servers, gateways, and devices may maintain and have knowledge of proximity information about other IoT entities. Accordingly, CAPA 134 may contact those IoT entities to retrieve proximity information of other IoT entities. Step 2 may be skipped if CAPA 134 already has the proximity information of IoT device 138 or IoT device 139.

At step 153, CAPA 134 contacts IoT device 139 to retrieve its context information as described in Table 3. Step 153 may be skipped if CAPA 134 already has or maintains context information of IoT device 139. CAPA 134 may contact other entities (e.g., an IoT server(s)) or a standalone service function(s) (e.g. context manager) to obtain the context information of IoT device 139. CAPA 134 may repeat step 153 to get context information of other destination entities if IoT device 138 indicates multiple destination entities in step 151. CAPA 134 may repeat step 153 to get context information of intermediary entities if IoT device 138 indicates anyone in step 151.

Figure 6:
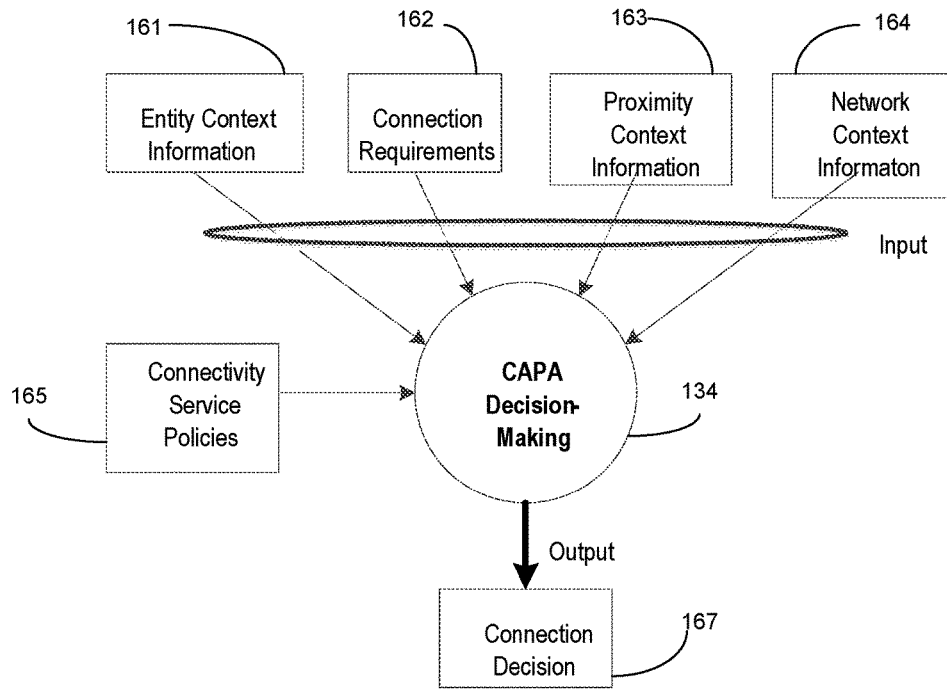
FIG. 6 illustrates an exemplary connection decision-making during connection establishment.

At step 154, CAPA 134 may take as input (as shown in FIG. 6) entity context information 161, connection requirements 162, proximity context information 163, or network context information 164, among other things. CAPA 134 also checks connectivity service policies 165 and decides appropriate connectivity (connectivity decision 167) for IoT device 138 and IoT device 139. This is illustrated in FIG. 6. The output of step 154 is appropriate service layer connectivity (e.g., one or multiple connections with different properties) for IoT device 138 and its destinations. If the determined service layer connection is Type-1, there may be one or more service layer intermediary entities determined by CAPA 134 as well. Actually, CAPA 134 may maintain a service layer overlay topology for some or all IoT entities it manages. CAPA 134 may collect or retrieve network context information as listed in Table 6. CAPA may maintain connectivity service policies. Some policy examples are given in Table 7.

With continued reference to step 154 and FIG. 6, CAPA 134 may maintain connectivity context information for each established connection (e.g., its properties as listed in Table 8). The process illustrated in FIG. 6 may work as follows. Each policy in Table 6 consists of two parts: condition and decision. For example, in the first policy, the "condition" is "If two devices behind a gateway are in proximity", and the "decision" is "use Type-3 direct service layer communications with direct link." CAPA 134 takes relevant context information as input to compare against "condition" of each policy. If context information matches the "condition," the "decision" of this policy will be selected. It is possible that context information matches with "condition" of multiple policies; then CAPA 134 may select the intersection of "decision" of each policy or maximum common set of "decisions" as the final decision. It is possible that different policies may have conflicts and CAPA 134 may detect such conflicts when new policies are introduced. In addition, different policies may have different priority. The policy with higher priority may be applied first and void other policies with lower priority if multiple policies are matched.

At step 155 of FIG. 5, CAPA 134 may notify IoT device 138 of the suggested path of the connection based on the decision of step 154. CAPA 134 also notifies IoT device 138 of the properties of the established connection as listed in Table 8. CAPA 134 may provide instructions to communicate using the path determined in step 154 (instructions may include security credentials, etc.). The instructions may be provided to IoT entities or link layer entities involved in establishing or otherwise using the path determined in step 154. At step 156, CAPA 134 may notify IoT device 139 of the suggested path of the connection based on the decision of step 154. CAPA 134 also notifies IoT device 139 of the properties of the established connection as listed in Table 8. CAPA may repeat this step for other destination entities if IoT device 138 indicates multiple destination entities in step 151. CAPA may repeat step 156 for intermediary entities if there is any intermediary entity determined in step 154. At step 157, CAPA 134 notifies proximity manager 137 of the established connection between IoT device 138 and IoT device 139 including its properties as listed in Table 8. As a result, proximity manager 137 becomes aware of service layer proximity information (e.g., Type-2 and Type-3) among different entities.

TABLE 3

Entity Context Information (IoT entity, such as IoT Device 138)

| Parameters | Meaning |
| --- | --- |
| Source Preference | Indicate IoT entity's preference in connectivity as a source entity. It could be:<br>No-Relay: IoT entity prefers to talk to its destination directly.<br>GW-Relay: IoT entity prefers communications with its destination to be relayed by an IoT gateway.<br>Server-Relay: IoT entity prefers communications with its destination to be relayed by an IoT server.<br>GW-Server-Relay: IoT entity prefers communications with its destination to be relayed by an IoT gateway and an IoT server.<br>Any: No preference. In other words, the IoT entity as a source may accept any option (e.g., No-Relay, GW-Relay, Server-Relay, and GW-Server-Relay) to talk to its destination. |
| Destination Preference | Indicate IoT entity's preference in connection as a destination entity. It could be:<br>No-Relay: IoT entity prefers to talk to its source directly.<br>GW-Relay: IoT entity prefers communications with its source to be relayed by an IoT gateway.<br>Server-Relay: IoT entity prefers communications with its source to be relayed by an IoT server.<br>GW-Server-Relay: IoT entity prefers communications with its destination to be relayed by an IoT gateway and an IoT server.<br>Any: No preference. In other words, the IoT entity as a destination may accept any option (e.g. No-Relay, GW-Relay, Server-Relay, and GW-Server-Relay) to talk to its source. |

TABLE 3-continued

Entity Context Information (IoT entity, such as IoT Device 138)

| Parameters | Meaning |
| --- | --- |
| Application Context | Indicate context information of IoT applications for which the connectivity is to be established such as:<br>The category and identifier of each application to be supported.<br>Does the application require unicast, multicast, or broadcast? If the application requires multicast or broadcast, GW-relayed or Server-relayed connection can help to establish more efficient multicast or broadcast tree.<br>Is the application delay-sensitive or not? If the application is delay-sensitive, No-relayed connection may be considered to help to reduce end-to-end delay.<br>Does the application need to transport a large volume of data? If the application produces massive data transmission, No-relayed connection may be considered to help to mitigate network traffic load and avoid potential congestion.<br>Is application data cacheable or not? If it is cacheable, GW-relayed or Server-relayed connection may help to cache the data. |
| Location Information | Indicate the location and mobility information of IoT entity such as:<br>Current location of IoT entity.<br>Moving speed and direction of IoT entity. |
| Device Profile | Indicate the device profile associated with the IoT entity such as:<br>Device identifier.<br>Communication protocols that IoT entity supports.<br>Resource constraints including residual energy, sleeping schedule, power saving mode, available storage, communication approaches and bandwidth, etc. |

TABLE 4

Possible Solution based on Source (Row) and Destination (Column) Preference

|  | No-Relay | GW-Relay | Server-Relay | GW-Server-Relay | Any |
| --- | --- | --- | --- | --- | --- |
| No-Relay | V |  |  |  | V |
| GW-Relay |  | V | V | V | V |
| Server-Relay |  | V | V | V | V |
| GW-Server-Relay |  | V | V | V | V |
| Any | V | V | V | V | V |

TABLE 5

Connection Parameters/Requirements

| Parameters | Meaning |
| --- | --- |
| Connectivity Type | Indicate the type of requested service layer connection (e.g., Type-1, Type-2, or Type-3). |
| Duration | Indicate the duration of requested service layer connection. |
| Data Rate | Indicate the supported data rate for the requested service layer connection. |
| Price | Indicate the price willing to pay for the requested service layer connection. |
| Protocol Type | Indicate the type of protocol to support the requested service layer connection (e.g., HTTP, CoAP, XMPP, MQTT, SOAP, FTP, SMTP, etc.). |
| Port Number | Indicate the port number to support the requested service layer connection (e.g., TCP or UDP port number). |
| Destination Entities | Indicate the list of destination entities (e.g., their names, identifiers or URI). Unicast has one destination, while multiple destinations for multicast. |
| Intermediary Entities | Indicate the list of intermediary entities. In most cases, the requester may only indicate destination entities and leave intermediary entities to be decided by CAPA 134. But in some cases, the requestor could designate intermediary entities or intermediary entity candidates in "Connection Creation Request" message. |

TABLE 6

Network Context

| Parameter | Meaning |
|---|---|
| Throughput | The service layer throughput between a pair of entities (e.g., messages/second, or bit/second). |
| Path Capacity | The minimum link layer capacity of a path between a pair of entities. |
| Number of Connections | Indicate the number of active connections at an IoT entity. |
| Number of Hosted Entities | Indicate the number of active entities hosted at an IoT entity. |
| Processing Speed | Indicate the message processing speed at an IoT entity (e.g., messages/seconds). |
| Available Computation | Indicate the available computation capability at an IoT entity (e.g., available CPU resource in percentage). |
| Available Storage | Indicate the percentage of available storage over the total storage size at an IoT entity. |
| Request Rate | Indicate the rate of incoming requests at an IoT entity (e.g., requests/seconds). |
| Congestion Degree | Indicate the congestion level at an IoT entity (e.g., the ratio of incoming traffic rate over outgoing traffic rate). |
| Message Queue Length | Indicate the length of message queue backlogged at an IoT entity. |

TABLE 7

Examples of Connectivity Service Policies

| Policies | Meaning |
|---|---|
| Policy #1 | If two devices behind a gateway are in proximity, use Type-3 direct service layer communications with direct link |
| Policy #2 | If two devices behind a gateway are in proximity but they need to use services provided by the gateway, use Type-2 direct service layer communications without direct link |
| Policy #3 | If a device behind the gateway multicasts data to other devices behind the gateway as well, use Type-1 indirect service layer communications to be relayed by the gateway. |
| Policy #4 | If two standalone devices need secure data sharing and can tolerate delay, use Type-1 indirect service layer communications to be relayed by an IoT server. |
| Policy #5 | If the IoT server is congested, use Type-2 direct service layer communications if there is no direct link between two standalone devices. |
| Policy #6 | If the IoT server is congested, use Type-3 direct service layer communications if there is direct link between two standalone devices. |
| Policy #7 | If the IoT server is not congested, use Type-1 indirect service layer communications so that standalone devices can use the services provided by the server. |

TABLE 8

Connection Properties

| Property | Meaning |
|---|---|
| Identifier | The unique identifier of an established connection. |
| Connectivity Type | Indicate the type of established connection (e.g. Type-1, Type-2, or Type-3 as described herein). |
| Duration | Indicate the allocated duration for the established service layer connection (e.g., lifetime). |
| Data Rate | Indicate the allocated data rate for the established service layer connection. |
| Price | Indicate the decided price for the established service layer connection. |
| Protocol Type | Indicate the type of allocated application protocol to support the established connection (e.g., HTTP, CoAP, XMPP, MQTT, SOAP, FTP, SMTP, etc.). This is especially the case for standalone devices or gateways that have enough resources to dynamically support multiple protocols based on different context information. However, even for constrained devices, it is possible to dynamically change their application protocols via approaches such as software update. |
| Port Number | Indicate the allocated port number to support the established connection (e.g. TCP or UDP port number). |

TABLE 8-continued

Connection Properties

| Property | Meaning |
|---|---|
| Destination | Indicate the list of destination entities (e.g., their names, identifiers and/or URI). |
| Application Context | Indicate the context information of applications supported over the established connection. |
| Security | Indicate allocated security feature for the established connection (e.g., security key for data encryption, token). |
| Intermediary Entities | Indicate the intermediary entities of the established connection. |
| Source Entity | Indicate the source entity of the established connection. |
| Destination Entities | Indicate the destination entity of the established connection. |

Entity context information 161, proximity context information 162, network context information 163, current connection context information 168, or connectivity service policies 165 may be changed in various M2M/IoT scenarios. Accordingly, previously established connection may become unsuitable or inefficient and may need to be dynamically adjusted. Service layer connectivity adjustment may be triggered by CAPA 134, proximity manager 137, underlying networks, source entity, destination entity, or intermediary entities due to different events. Exemplary events include: 1) source and destination entities (e.g., IoT device 138 and IoT device 139) are out of proximity; 2) a network becomes congested; 3) network congestion becomes mitigated; 4) being actively requested by an IoT entity; 5) a proximity manager sends new proximity information to CAPA 134 to adjust service layer connectivity; or 6) an IoT entity sends new context information to CAPA 134 to adjust service layer connectivity.

Figure 7:
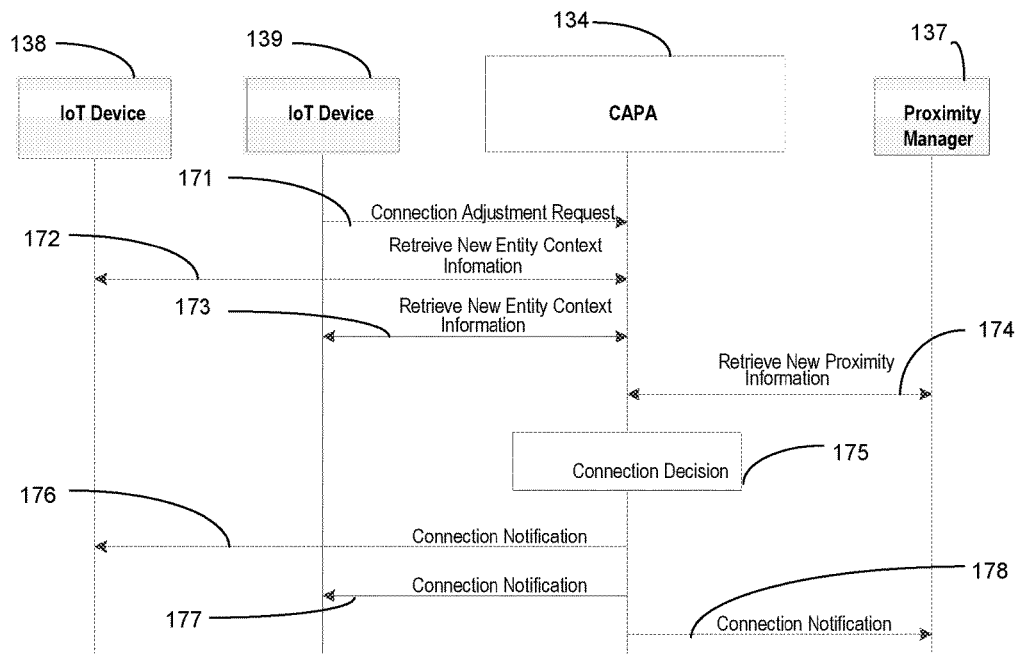
FIG. 7 illustrates an exemplary method where service layer connectivity adjustment is triggered by an Internet of Things (IoT) entity.

FIG. 7 illustrates an exemplary case where service layer connectivity adjustment is triggered by an IoT entity. At step 171, IoT device 139 (or IoT device 138) actively sends a "connection adjustment request" to CAPA 134. This message may contain the following information: new context information of IoT device 139 (or IoT device 138), such as their new location as listed in Table 3; new connection requirement or adjustment reason, such as requesting a longer duration or add/remove a destination entity as listed in Table 5; and an identifier and/or token associated with the connection to be adjusted.

At step 172, CAPA 134 retrieves the latest entity context information of IoT device 138 as listed in Table 3. This step may be skipped, if CAPA 134 has already had or maintained the context information of IoT device 138. CAPA 134 may contact other entity (e.g., another IoT server) and/or a standalone service function (e.g., context manager) to obtain the context information of IoT device 138. CAPA 134 may repeat step 172 to get context information of intermediary, if there is any intermediary entity associated with the connection to be adjusted.

At step 173, CAPA 134 retrieves the latest entity context information of IoT device 139 as listed in Table 3. This step may be skipped, if CAPA 134 has already had or maintained the context information of IoT device 139. CAPA 134 may contact other entity (e.g., another IoT server) and/or a standalone service function (e.g., context manager) to obtain the context information of IoT device 139. At step 174, CAPA 134 retrieves the latest proximity context information about IoT device 138 and IoT device 139 from proximity manager. This step may be skipped, if CAPA 134 has already had or maintained proximity context information about involved entities.

Figure 8:
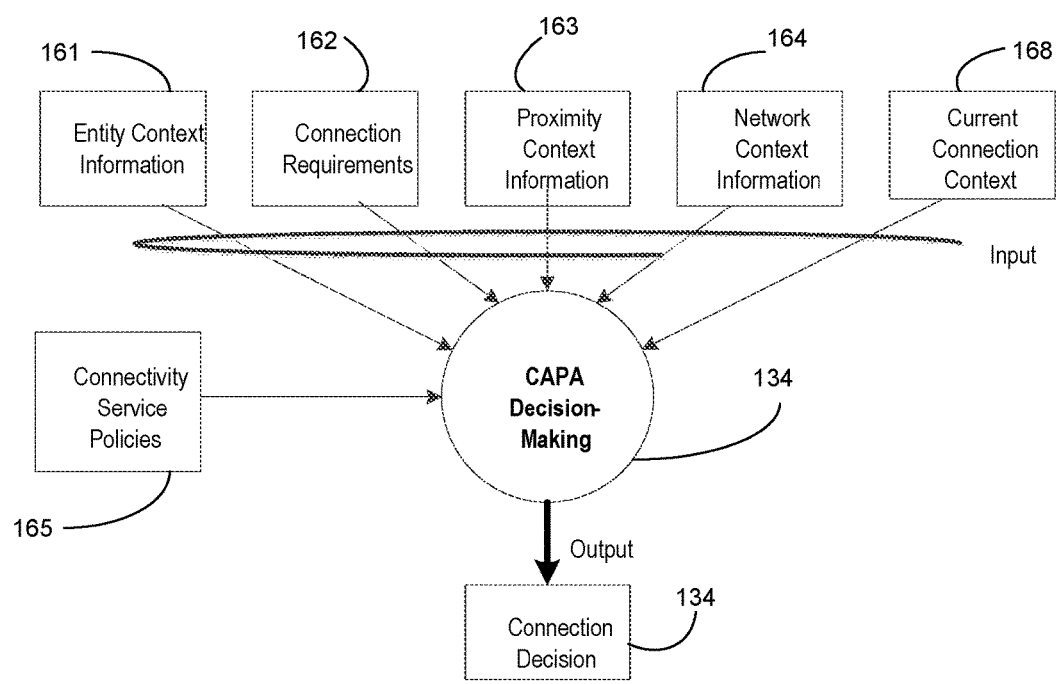
FIG. 8 illustrates an exemplary connection decision-making during connection adjustment.

At step 175, CAPA 134 takes entity context information 161 (as listed in Table 3), connection requirements/parameters 162 (as listed in Table 5), proximity context information 163, network context information 164 (as listed in Table 6), and current connection context 168 as input, checks connectivity service policies 165 (as listed in Table 7), and decides new appropriate service layer connection (connection decision 167) for IoT device 138 and IoT device 139, as illustrated in FIG. 8. Step 175 is similar to step 154 in FIG. 6. At step 176, CAPA 134 notifies IoT device 138 of the adjusted connection including its properties as listed in Table 8. At step 177, CAPA 134 notifies IoT device 139 of the adjusted connection including its properties as listed in Table 8. CAPA 134 may repeat this step for intermediary entities if there is any intermediary entity determined in step 175. At step 178, CAPA 134 notifies proximity manager 137 of the adjusted connection between IoT device 138 and IoT device 139, including its properties as listed in Table 8.

Figure 9A:
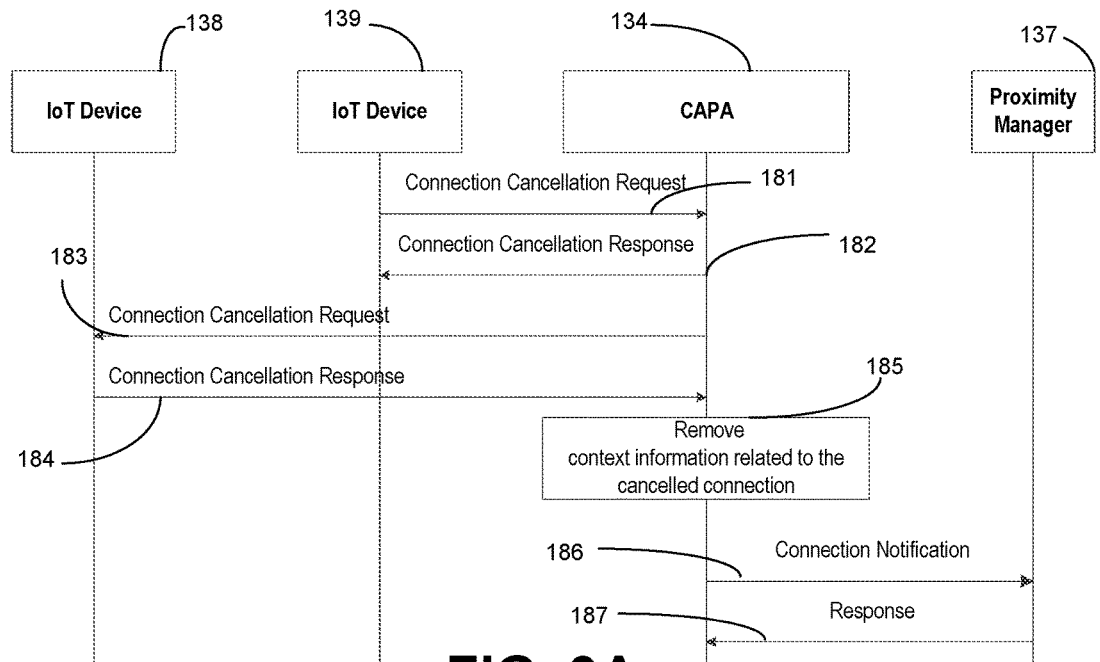
FIG. 9A illustrates an exemplary method for connection cancellation.
Figure 9B:
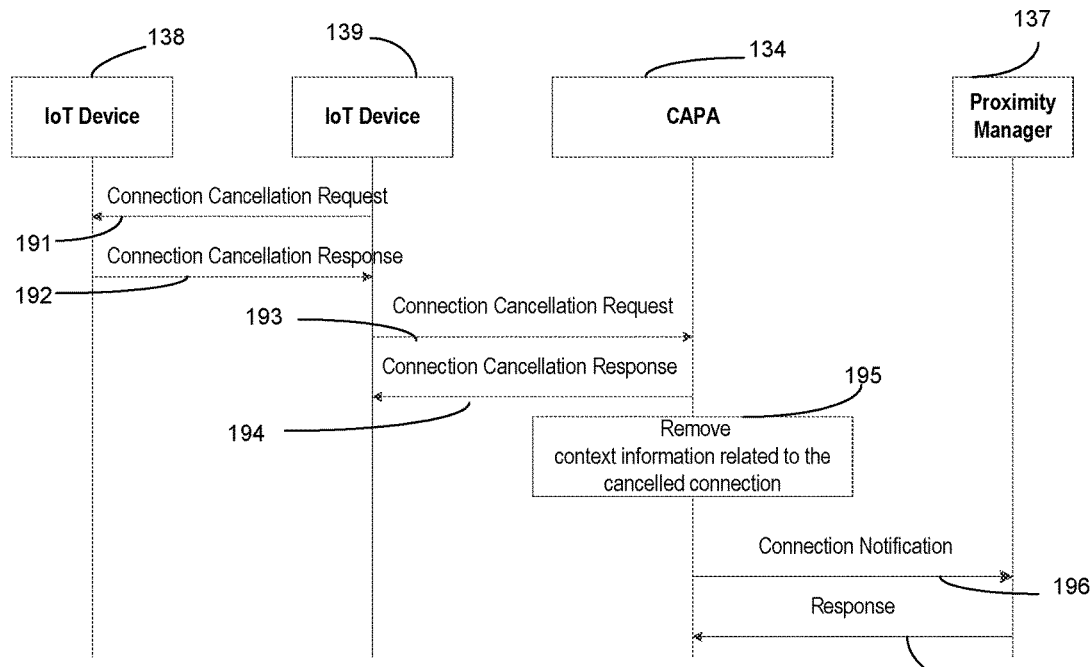
FIG. 9B illustrates another exemplary method for connection cancellation.

The established connection may be cancelled before it expires. CAPA 134 or IoT entities (e.g., source entity, destination entities, or intermediary entities), proximity manager 137, or underlying networks may request to cancel the established connection. FIG. 9A and FIG. 9B illustrates methods for connection cancellation. In FIG. 9A and FIG. 9B, it may be assumed that IoT device 138 and IoT device 139 are a pair of IoT entities of an established connection, which is to be cancelled.

FIG. 9A illustrates an exemplary option for connection cancellation. At step 181, IoT device 139, as the requestor, sends a "connection cancellation request" to CAPA 134. This message may contain the following information or parameters: identifier of the connection to be cancelled, identifier of other entities involved in the connection, cancellation reason, latest context information, or suggested suitable service layer communication mode, among other things. The identifier or token of the connection to be cancelled may be a parameter. This message may contain multiple identifiers or tokens and accordingly multiple existing connections can be cancelled using this single message. The identifier of other entities (e.g., IoT device 138) involved in this connection may be a parameter. CAPA 134 may maintain such information in its context database, but to contain it in this message may help CAPA 134 to authenticate further this cancellation request message. The cancellation reason may be a parameter. It may be a) this connection is not needed any more; or b) this connection becomes unsuitable now because of the change of context information at IoT device 139 (e.g., IoT device 138 and IoT device 139 are moving away from each other and out of proximity), among other things. The latest context information of IoT device 139, for example, its current location may be a parameter. The suggested suitable service layer communication mode for the future (e.g., Type-1, Type-2, or Type-3) also may be a parameter.

At step 182, CAPA 134 sends "connection cancellation response" to IoT device 139. After receiving this message, IoT device 139 removes the local context information related to the cancelled connection. At step 183, CAPA 134 sends a "connection cancellation request" to IoT device 138. This message may contain the identifier or token of the connection to be cancelled. It is the similar to what is contained in step 181. The message may also contain the cancellation reason as contained in step 181.

At step 184, IoT device 138 sends a "connection cancellation response" to CAPA 134. IoT device 138 may remove the local context information related to the cancelled connection after receiving the cancellation request message from CAPA 134 in step 183. If the cancelled connection involves other intermediary entities besides IoT device 138 and IoT device 139, CAPA 134 may repeat step 183 and step 184 for each intermediary entity. At step 185, CAPA 134 removes local context information related to this cancelled connection. At step 186, CAPA 134 sends a "connection notification" to proximity manager 137 to inform it of this cancelled connection between IoT device 138 and IoT device 139. At step 187, proximity manager 137 sends a response message back to CAPA 134.

FIG. 9B illustrates another exemplary option for connection cancellation at step 191, IoT device 139 as the requestor sends a "connection cancellation request" to IoT device 138. This message may contain the parameters, such as identifier of the connection to be cancelled, cancellation reason, or suggested suitable service layer communication mode, among other things. The cancellation reason may be: a) this connection is not needed any more; or b) this connection becomes unsuitable now because of the change of context information at IoT device 139 (e.g. IoT device 139 is moving away from IoT device 138 and out of its proximity), among other things. The suggested suitable service layer communication mode for the future may be Type-1, Type-2, or Type-3, or the like.

At step 192, IoT device 138 sends a "connection cancellation response" to IoT device 139. IoT device 138 may also removes the local context information related to the cancelled connection. At step 193, IoT device 139 as the requestor sends a "connection cancellation request" to CAPA 134. This message may contain the following information or parameters: identifier of the connection to be cancelled, identifier of other entities involved in the connection, cancellation reason, latest context information, or suggested suitable service layer communication mode, among other things (similar to step 181 above).

At step 194, CAPA 134 sends a "connection cancellation response" to IoT device 139. After receiving this message, IoT device 139 may remove the local context information related to the cancelled connection. At step 195, CAPA 134 removes local context information related to this cancelled connection. At step 196, CAPA 134 sends a "connection notification" to proximity manager 137 to inform it of this cancelled connection between IoT device 138 and IoT device 139. At step 197, proximity manager 137 sends a response message back to CAPA 134.

As mentioned herein, CAPA 134 may have a connectivity service policy database to maintain connectivity service policies 164. When CAPA 134 performs connection establishment or adjustment, it takes context information and proximity information as input to check again each policy. If there is a matching policy found, CAPA 134 enforces this policy for the connection establishment or adjustment. In addition, based on the maintained policies, CAPA 134 could automatically generate and perform connectivity cancellation. For example, if the policy is "use Type-2 mode for device A and device B when the congestion level of IoT server is higher than a threshold," CAPA 134 may trigger connectivity adjustment when it perceives that the IoT server's congestion level is below the threshold.

Accordingly, CAPA 134 supports dynamically managing those policies as listed in Table 7 in different scenarios. In an example, a standalone management application manages connectivity service policies for IoT entities. For example, to add new policies to CAPA 134, to remove existing policies from CAPA 134, to change existing policies in CAPA 134, to combine existing policies in CAPA 134, etc. In another example, an IoT entity (e.g., IoT device 138) manages its policies for its own connectivity. The IoT entity may retrieve/update/remove existing policies in CAPA 134 which are applicable to itself, request to add new policies for itself, and subscribes on new policies on itself, etc. In another example, policy manager 137 (which may be standalone) manages connectivity service policies. Policy manager 137 may create new connectivity service policies for CAPA 134, change existing policies in CAPA 134, combine existing policies in CAPA 134, etc. Also, CAPA 134 can request to retrieve connectivity service policies from policy manager 137 for particular IoT entities (e.g., IoT device 138 or IoT device 139).

Figure 10:
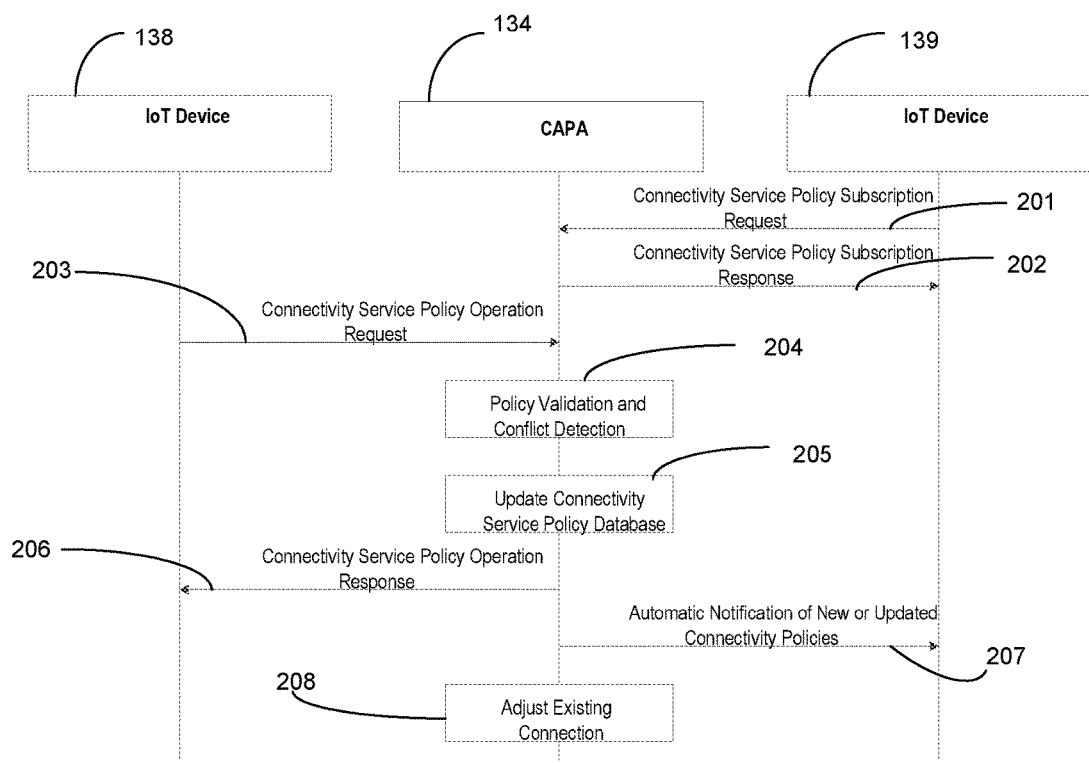
FIG. 10 illustrates an exemplary method for connectivity service policy management.

FIG. 10 illustrates the procedures for connectivity service policy management. At step 201, IoT device 139 sends a "connectivity service policy subscription request" to CAPA 134 to subscribe on new or updated connectivity service policies, which may take place in the future. With this subscription, CAPA 134 may send automatic notifications to IoT device 139, if the subscribed policies and/or their changes occur later (e.g. in step 207). IoT device 139 may make the following, but not limited to, policy subscriptions: Subscription on any new or changed policies applicable to IoT device 139. Subscription on any new or changed policies may be applicable to other entities. Those entities may be controlled or managed by IoT device 139. For example, an IoT gateway subscribes new or changed policies on its devices or applications; an IoT server may subscribe new or changed policies on its devices/gateways or network applications. The identifier of those entities will be contained in this request message.

At step 202, CAPA 134 sends a "connectivity service policy subscription response" to IoT device 139 to approve or reject the policy subscription request in step 201. At step 203, the requestor IoT device 138 sends a "connectivity service policy operation request" message to CAPA 134. The operation type on policies may be: a) update existing polices; b) create new policies; c) combine existing policies; 4) remove existing policies; or 5) retrieve existing policies, or the like. IoT device 138 indicates the operation type, the identifier of policies to be manipulated, and the representation of new policies to be created.

At step 204, if step 203 reports or requests to create new policies, CAPA 134 may perform policy validation and conflict detection. For example, if IoT device 138 requests to create a new policy or update an existing policy, CAPA 134 needs to detect if the new or updated policy has any conflict with existing policies. At step 205, if new policies need to be created or existing policies need to be updated, CAPA 134 may update connectivity service policy database if policy validation and conflict detection are passed. At step 206, CAPA 134 sends a "connectivity service policy operation response" to the requestor IoT device 139. The full representation of the new or updated policy may be contained in this message.

At step 207, CAPA sends automatic notification about new or updated connectivity service policies (e.g., the full representation of new or updated policies) to IoT device 139 as it has subscribed in step 201. One exemplary use case for IoT device 139 to receive policy change notification is: IoT device 138 is a management application A, CAPA 134 resides at IoT server 136, and IoT device 139 is an IoT device. Then after the management application A (not shown, but may reside on any number of devices) configures and changes the policies, which are maintained at IoT server 136, but for IoT device 139, it is beneficial for CAPA 134 to inform the IoT device 139 of the new policy. For example, if the new policy for the IoT device 139 is "never use Type-2 or Type 3 mode for the IoT device 139", IoT device 139 will never try to discover/obtain/establish direct link-layer connectivity since it is not needed for Type-1 mode that is the only mode the new policy allows; accordingly, IoT device 139 can disable any function or procedure (e.g., device discovery, device association, direct link establishment) related to discovering/obtaining direct link-layer connectivity. At step 208, based on the updated policies as done in step 205, CAPA 134 may trigger to adjust existing connection. Then procedures in FIG. 7 about connection adjustment may be performed. IoT device 139 may be able to send or override (not shown) a desired notification update.

Figure 11:
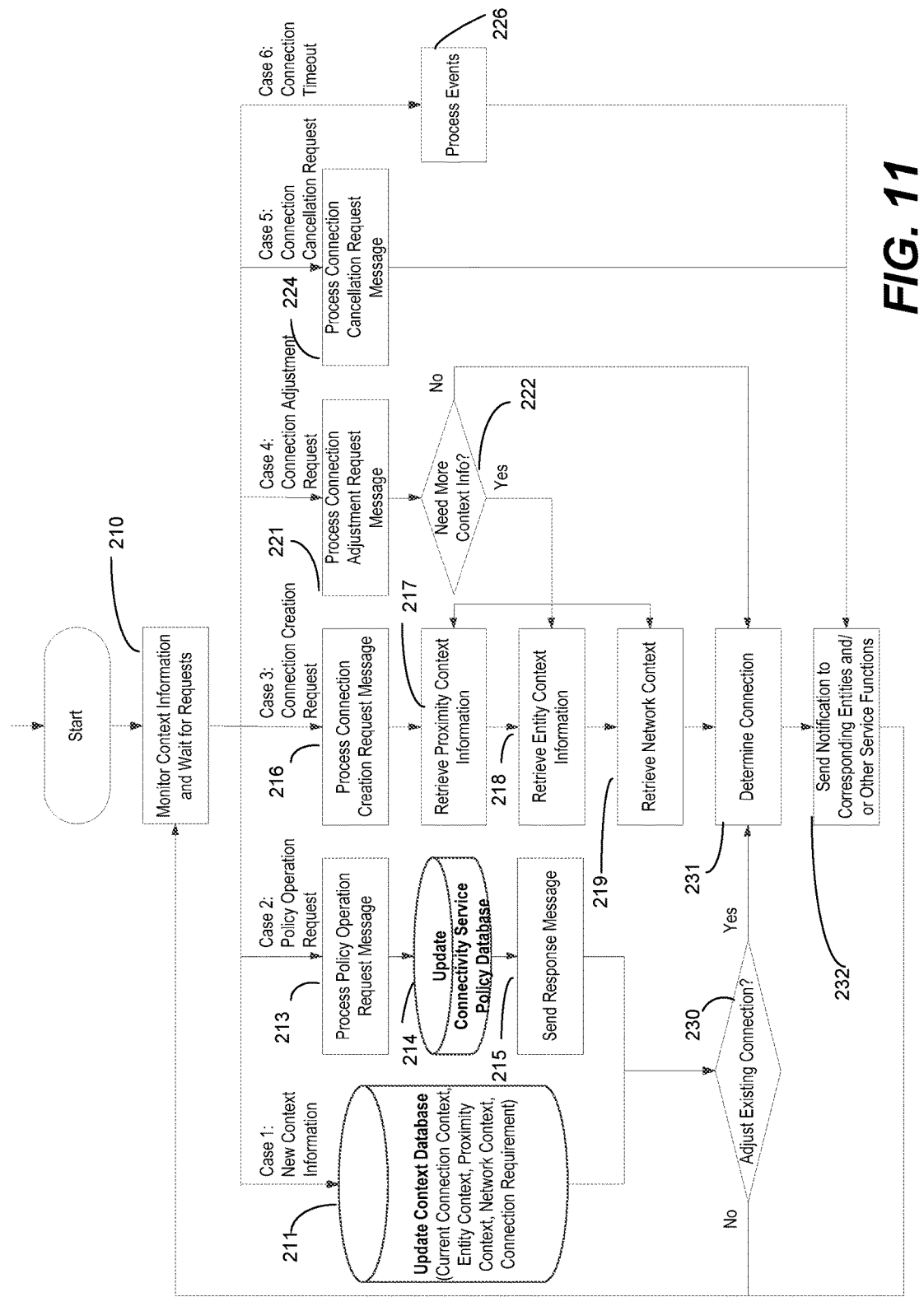
FIG. 11 illustrates an exemplary flow chart of CAPA functionalities.
Figure 12:
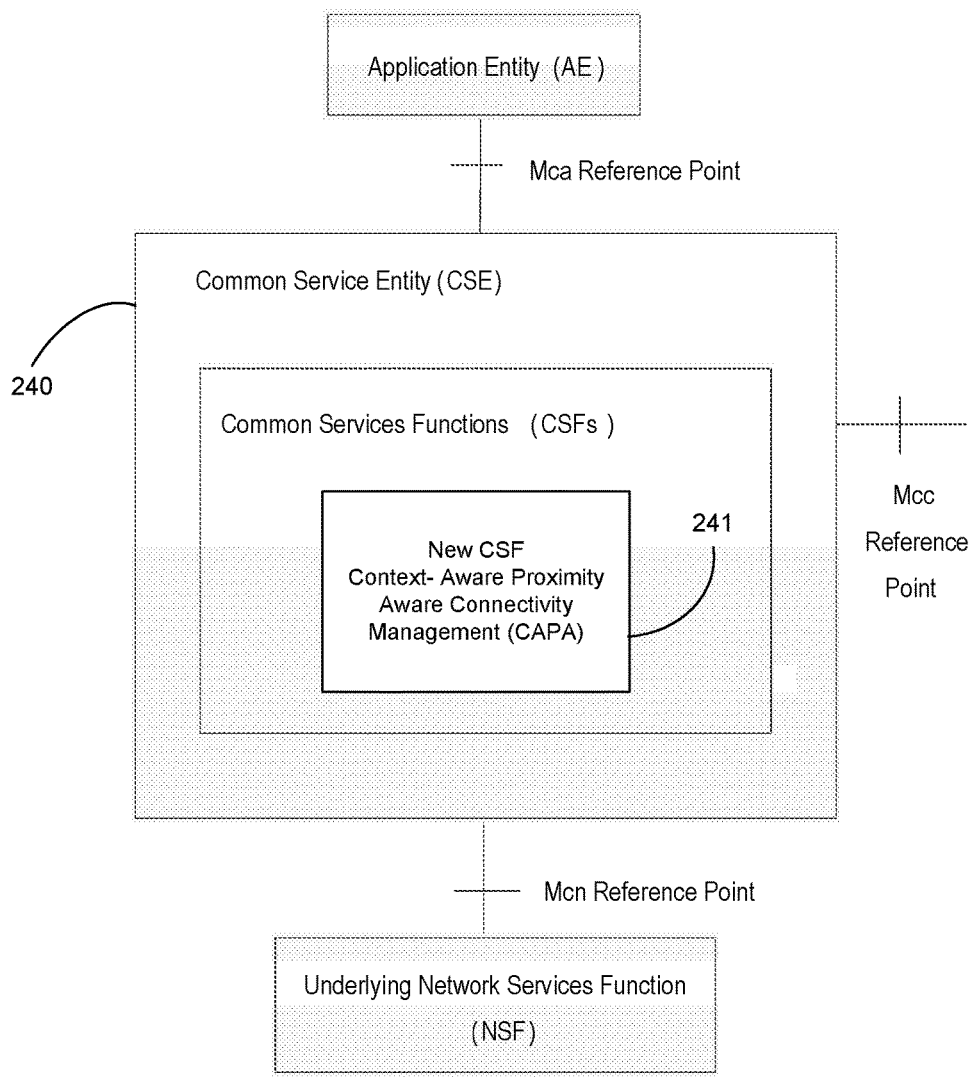
FIG. 12 illustrates an exemplary CAPA common service functions (CSF) in oneM2M.

FIG. 11 illustrates an exemplary flow chart of CAPA 134 functionalities. CAPA 134 may maintain context database and connectivity service policy database. Context database may maintain entity context information 161, network context information 164, proximity context information 163, and existing connection context information 162. Connectivity service policy database may maintain connectivity service policies 165.

In summary, CAPA 134 keeps monitoring context information and waits for request messages (from external entities) and internal events. Exemplary cases are summarized below with regard to FIG. 11. In case 1, at step 210, CAPA 134 monitors new context information, it may update context database at step 211. The updated context information may trigger connection adjustment. CAPA 134 may use different methods or systems to monitor context information at step 210. For example, CAPA 134 may make subscriptions to other service layer functions (e.g., proximity manager 137) and/or underlying network functions (e.g., MME in cellular core network) to receive automatic notification when context information changes. In another example, CAPA 134 may periodically access those service layer functions and/or underlying network functions to retrieve the latest context information. Also, IoT entities may actively and periodically report their context information to CAPA 134. The updated context information at step 211 may trigger the enforcement of an existing connectivity service policy at step 230. As a result, the adjustment of corresponding connection may be required accordingly.

In case 2, if CAPA 134 receives a policy operation request message at 210, it may process this message at step 213. Then CAPA 134 may update connectivity service policy at step 214 as requested by the requestor and at step 215 send policy operation response message to the requestor. Then, the updated policy may trigger to adjust existing connection at step 230; otherwise, CAPA 134 continues to monitor context information and wait for next request message.

In case 3, if CAPA 134 receives a connection creation request message to establish new connection, it may process the request message at step 216. CAPA 134 may need to retrieve proximity context information (step 217), entity context information (step 218), and network context information (step 219). It determines appropriate connection for the requestor (step 231) based on retrieved context information and information contained in the request message. Then at step 232, it sends out notification to corresponding entities.

In case 4, CAPA 134 receives a connection adjustment request message, processes the request message (step 221). At step 222, if there is not enough context information contained in this message and/or in databases (e.g., context database or connectivity service policy database), CAPA 134 will retrieve proximity context information (step 217), entity context information (step 218), and network context information (step 219). CAPA 134 determines the connection for the requestor (step 231) based on retrieved context information and information contained in the request message. Then it sends out notification to corresponding entities at step 232.

In case 5, CAPA 134 receives connection cancellation request message, it will first process the cancellation request message at step 224. CAPA 134 may update context database, for example, to remove context information related to the connection to be cancelled. It sends a notification and/or a response to corresponding entities or other service functions at step 232. The notification may be: a) CAPA 134 sends response message to the requestor; b) CAPA 134 needs to send cancellation request to other entities which are involved in the cancelled connection; or c) CAPA 134 may send notification to proximity manager or other service layer functions (e.g. event management) about the cancelled connection, among other things.

In case 6, if connection timeout event occurs due to a previously established connection may become expired, CAPA 134 cancels the connection at step 226 and may send notification and/or response to corresponding entities at step 232.

Disclosed herein are examples with regard to applying CAPA to oneM2M architecture including new resources. CAPA may be a common service function (CSF), which can be applied to oneM2M (oneM2M-TS-0001 oneM2M Functional Architecture-V-0.2.2, November 2013) as a new CSF to manage service layer connectivity. As shown in FIG. 13, CAPA CSF 241 can be a part of a common service entity (CSE) 240 (e.g., an IoT device, gateway, or server) and has the functionalities as described herein. CAPA CSF 241 may use Mcn reference point to obtain context and underlying information for the underlying network. For example, CAPA CSF 241 may use 3GPP Le interface (3GPP TS 23.002; Technical Specification Group Services and Systems Aspects; Network architecture) or 3GPP MTC Tsp interface (3GPP TS 29.368; Tsp interface protocol between the MTC Interworking Function (MTC-IWF) and Service Capability Server (SCS)) to get such context and proximity information in different ways. 3GPP entities may actively push such context and proximity information to CAPA CSF 241 Le or Tsp interface. CAPA CSF 241 actively pulls or retrieves such context and proximity information from 3GPP entities via Le or Tsp interface.

Figure 13A:
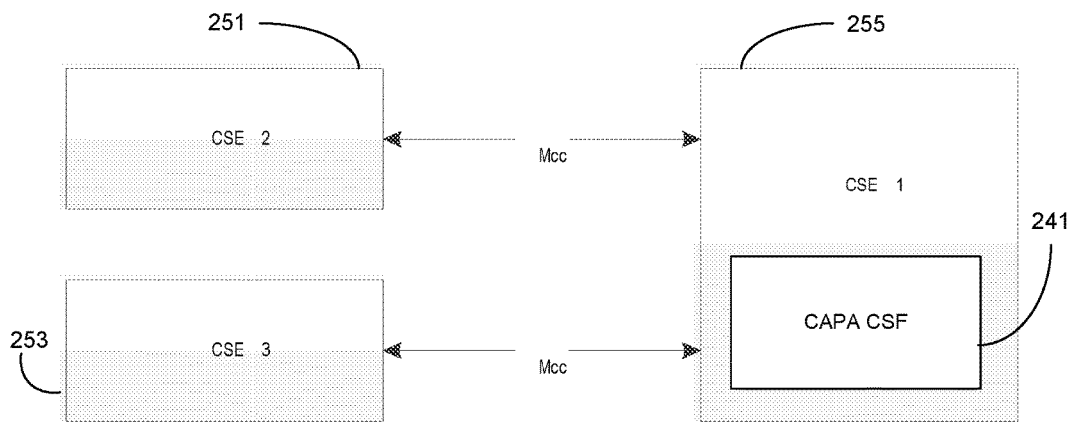
FIG. 13 illustrates exemplary CAPA scenarios in oneM2M.
Figure 13B:
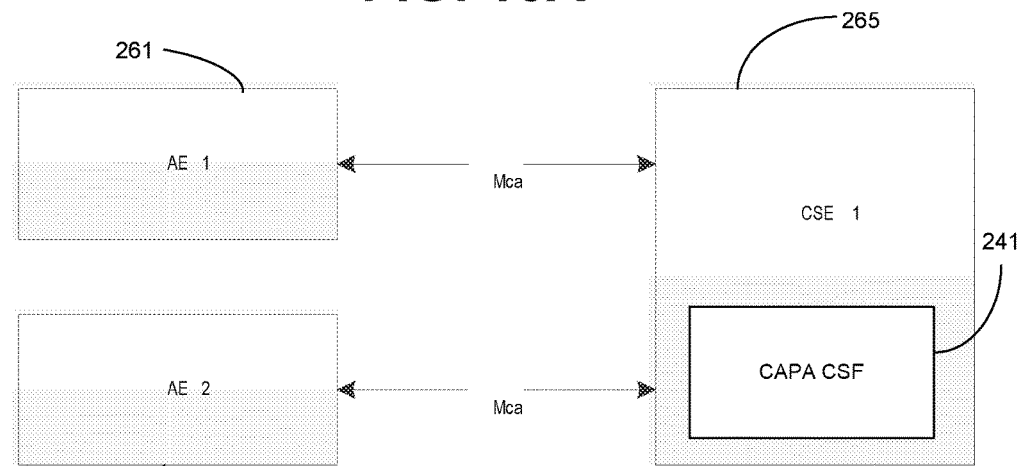
Figure 13C:
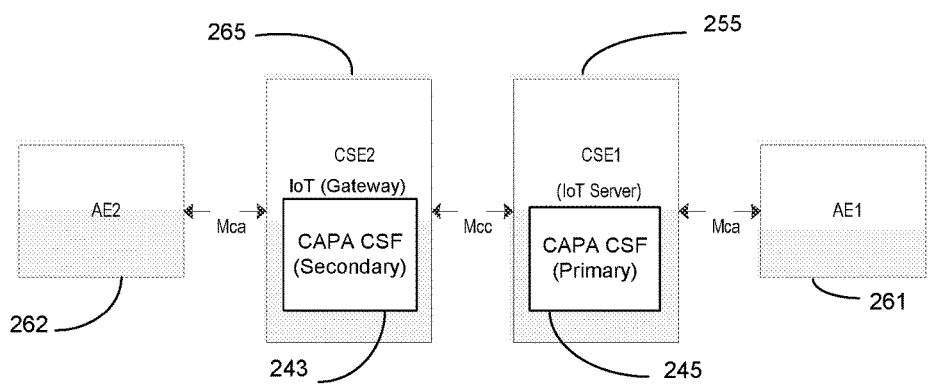

CAPA CSF 241 may be leveraged for scenarios, which are illustrated in FIG. 13A-FIG. 13C. In FIG. 13A, CAPA CSF 241 may reside in an infrastructure node (e.g., IoT server 255) to manage service layer connectivity between two standalone end node (e.g., IoT device 251 and IoT device 253).

In FIG. 13B, CAPA CSF 241 may reside in an intermediary node (e.g., IoT gateway 265) to manage service layer connectivity between two constrained end node (i.e. sensor node 261 and sensor node 262). In this scenario, IoT gateway 265 has the CAPA CSF 241 functionalities. It is responsible for calculating/establishing best connections for constrained devices. IoT gateway 265 may also maintain context information for constrained devices to make decisions about appropriate connections. By doing so, IoT gateway 265 may dynamically enable Type-3 direct service layer communications between constrained devices (sensor node 261 and sensor node 262), which will lead to various advantages and benefits such as reduced power consumption, reduced transmission latency, reduced load on gateway or other network elements, and improved quality of service.

In FIG. 14(c), CAPA CSF 241 resides in both IoT server 255 and IoT gateway 265 to manage service layer connectivity between network application 261 and device application 262. The connectivity decision is made by the primary CAPA CSF 245 in the IoT server, while CAPA CSF 243 in IoT gateway 265 is secondary and performs "IoT entity" functions in the procedures described herein. CAPA CSF 243 at the IoT gateway may perform the following functions: 1) CAPA CSF 243 may act as a "CAPA" role as described herein to handle interactions between IoT gateway 265 and device application 262; 2) Then, CAPA CSF 243 acts as an "IoT entity" role as described herein to handle interactions between IoT gateway 265 and IoT server 255.

Figure 14:
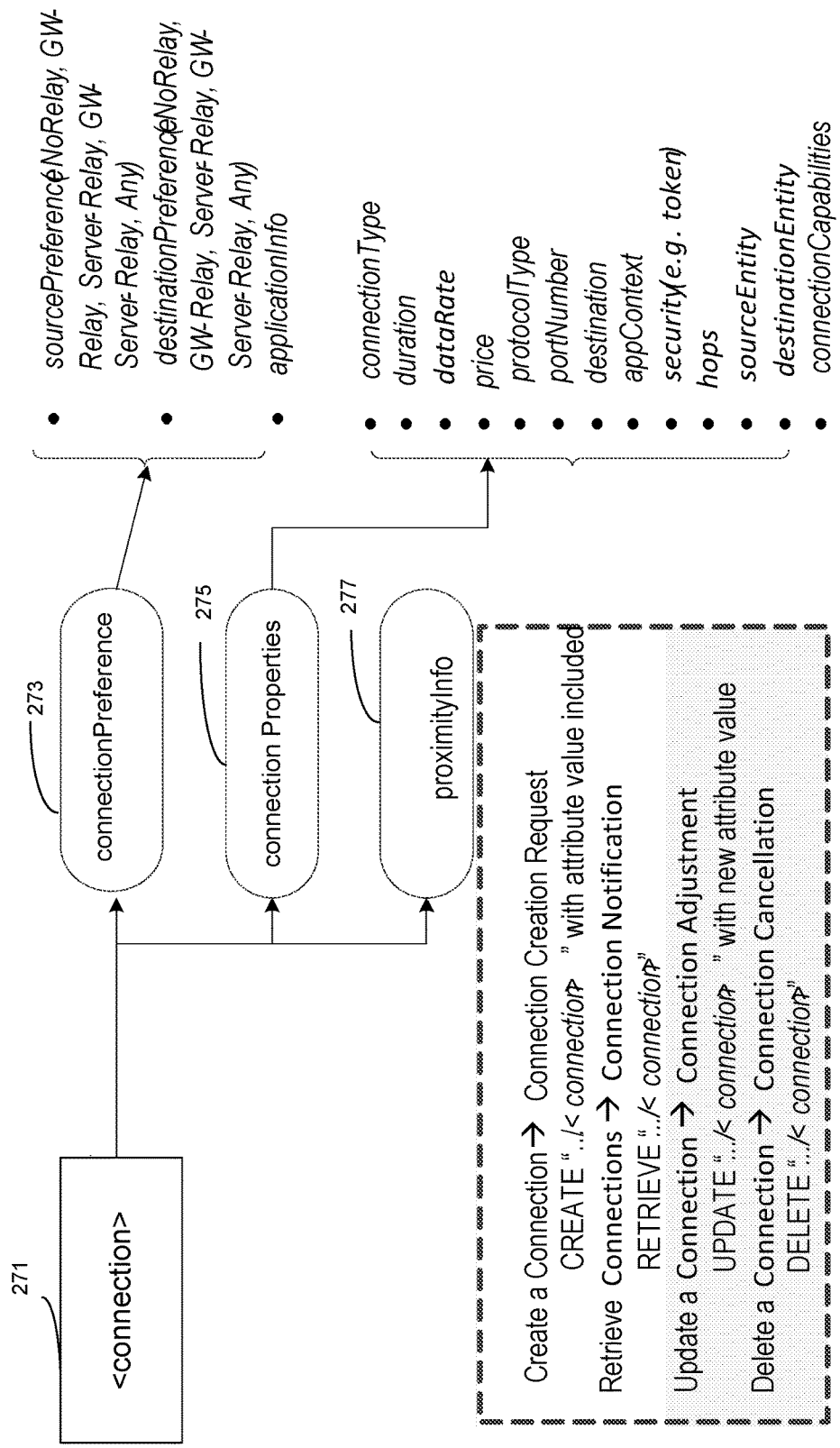
FIG. 14 illustrates exemplary resources to Support CAPA CSF in oneM2M.

In order to implement the proposed CAPA CSF procedures in oneM2M architecture, a new resource <connection> may be used as shown in FIG. 14. CAPA CSF 241 hosts and maintains this resource <connection>, which has sub-resources that may include a connectionPreference, connectionProperties, or proximityInfo. connectionPreference has attributes to stand for source preference and destination preference as described in Table 3. connectionProperties has attributes to stand for connection properties as described in Table 8. proximityInfo represents the proximity information about the source and destination entity of a connection such as location of each entity and distance between a pair of entities.

Representational state transfer (RESTful) methods may be employed onto <connection> resource to realize functions including connection creation request, connection adjustment request, connection notification, and connection cancellation. Connection creation request can be for an IoT entity to use CREATE method to request to establish new connection with another entity. Some attribute values of <connection> will be contained in this CREATE message. Connection notification can be for an IoT entity to use RETRIEVE method to get connection notification. The presentation of <connection> resource is returned back to the entity. Optionally, the entity may first subscribe to a <connection>. Then the entity may receive automatic notification from CAPA when the attributes of <connection> have changed. Connection adjustment can be for attributes of a <connection>, updated using UPDATE method to realize connection adjustment function. Connection cancellation may use DELETE method to delete a <connection> to realize connection cancellation function.

In addition to implementing CAPA as a standard service function, for instance in oneM2M, CAPA may also be implemented as an application solution. For example, CAPA may be implemented as a cloud-based application service. Existing standardized oneM2M devices/gateways may leverage this cloud-based application service to enhance their connectivity. Such cloud-based CAPA application service may have procedures and functions for connection establishment, connection adjustment, connection cancellation, and policy management as described below and elsewhere herein. Those functions may be realized in a RESTful way and as a result, the new resources in FIG. 14 need to be supported in the cloud-based CAPA application service. Those functions may also be realized in a non-RESTful way and as a result, each procedure message as discussed herein may be implemented in a remote procedure call or a command.

Based on the CAPA procedures and functionalities, as discussed herein, the following are impacts of CAPA and additional functions introduced to M2M/IoT devices and/or gateways. M2M/IoT devices or gateways support the proposed connection establishment function as discussed herein. For example, devices or gateways support sending "connectivity creation request" to CAPA and receiving "connectivity notification" from CAPA. Devices or gateways report context information such as source preference or destination preference to CAPA. A gateway may support CAPA function for connection establishment for other devices behind it.

Other supported functionality, M2M/IoT devices or gateways support the proposed connection adjustment function as discussed herein. For example, devices or gateways support sending "connectivity adjustment request" to CAPA and receiving "connectivity notification" from CAPA. Devices or gateways report context information such as source/destination preference to CAPA. A gateway may support CAPA function for connection adjustment for other devices behind it.

Another example supported functionality, M2M/IoT devices or gateways support the proposed connection cancellation function as discussed herein. For example, devices or gateways support sending "connectivity cancellation request" to CAPA and receiving "connectivity cancellation response" from CAPA. A device or gateway as a proxy may perform connectivity cancellation on behalf of other devices/gateways. A gateway may support CAPA function for connection cancellation for other devices behind it.

In summary, devices/gateways support different messaging for CAPA and support access to new CAPA resources as depicted in FIG. 14. Gateways may also support CAPA functions and host new CAPA resources.

CAPA is capable of leveraging proximity information and other context information and policies for dynamic service layer connectivity management as a common service function of service layer (e.g., a CSF in oneM2M or a SC in ETSI M2M). CAPA may reside in different IoT entities (e.g., IoT devices, gateways, servers, applications) to facilitate to establish optimal connections and/or dynamically adjust connections among IoT entities. Although devices (e.g., IoT device 139) are mentioned in examples throughout other IoT entities (also called nodes) may be substituted consistent with what is disclosed herein. The terms "IoT entity" and "service layer entity" are used interchangeably herein. CAPA may reside in an IoT gateway to coordinate connection establishment and adjustment among IoT devices that are behind the gateway based on their proximity information and other context information. For instance, CAPA may enable two devices behind the gateway to directly talk with each other at the service layer when they have a good direct link available, or instruct them to go to the gateway for relaying when they are not in proximity or need value-added services provided at the gateway. In another example, CAPA may be implemented as a part of an IoT server to manage service layer connectivity among standalone IoT devices that register to the server. When the server is congested or two devices are in proximity, CAPA may enable devices to communicate with each other directly at the service layer, bypassing the server. If one source device wants to multicast data to multiple other devices out of proximity, CAPA may instruct the source device to unicast data to the server first, then the sever helps to relay and multicast data to other destination devices again at the service layer.

While the 3GPP, oneM2M, and ETSI M2M architectures are described by way of background herein and may be used to illustrate subject matter described herein, it is understood that implementations of the subject matter described herein may vary while remaining within the scope of the present disclosure. One skilled in the art will also recognize that the disclosed subject matter is not limited to implementations using the 3GPP, oneM2M, and ETSI M2M architectures discussed above, but rather may be implemented in other architectures.

Figure 15A:
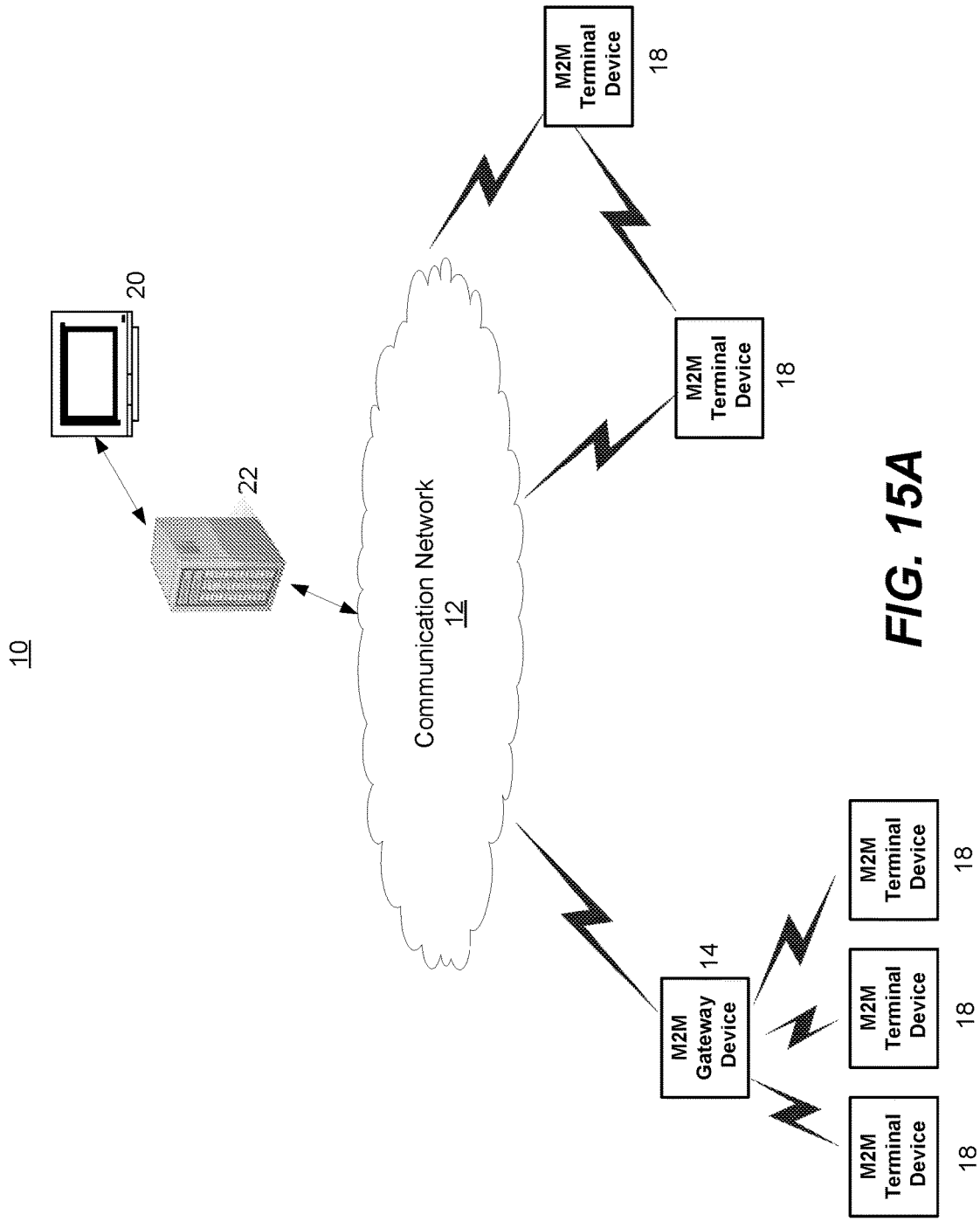
FIG. 15A is a system diagram of an example machine-to-machine (M2M) or Internet of Things (IoT) communication system in which the disclosed subject matter may be implemented.
Figure 15B:
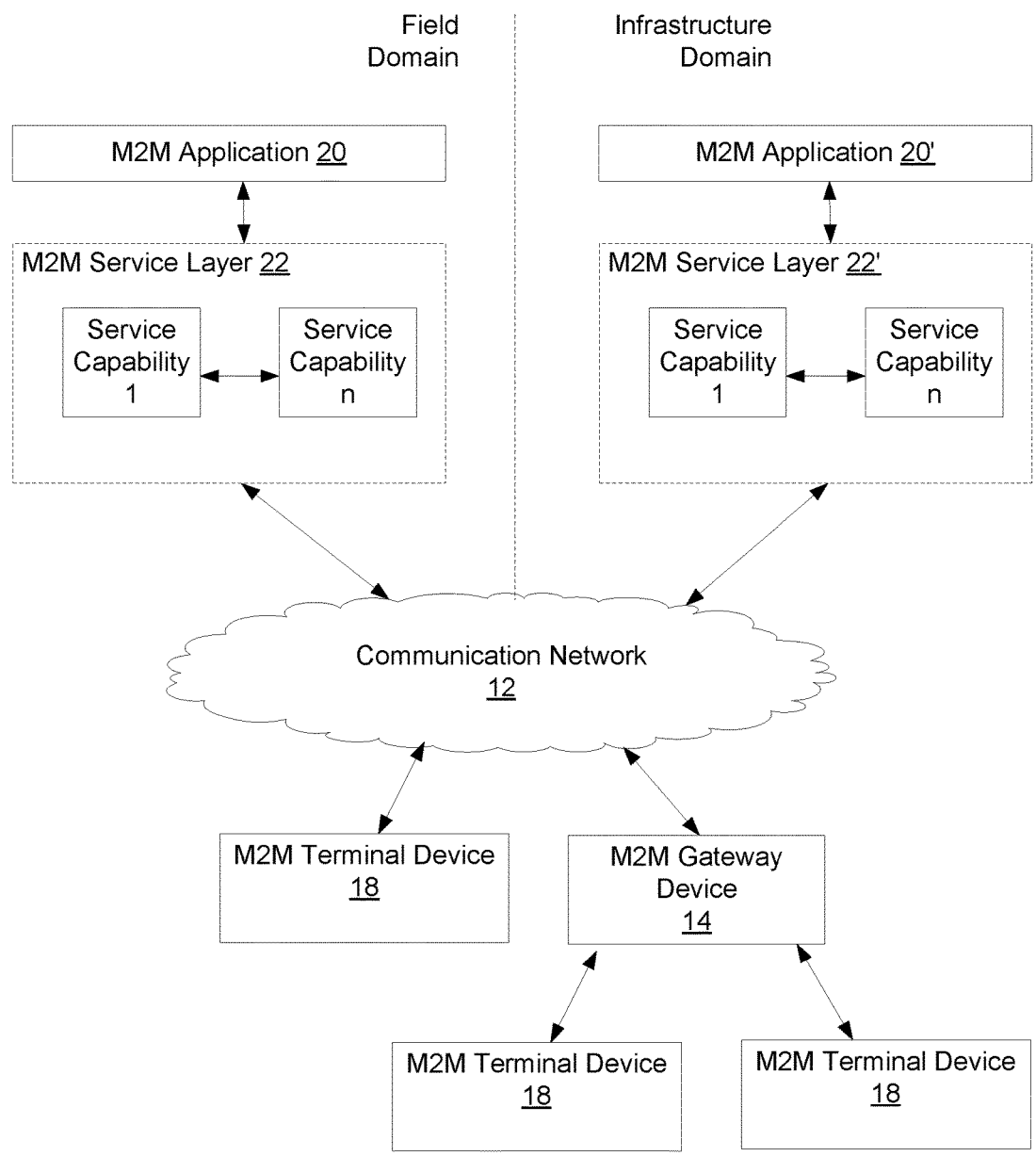
FIG. 15B is a system diagram of an example architecture that may be used within the M2M/IoT communications system illustrated in FIG. 15A.
Figure 15C:
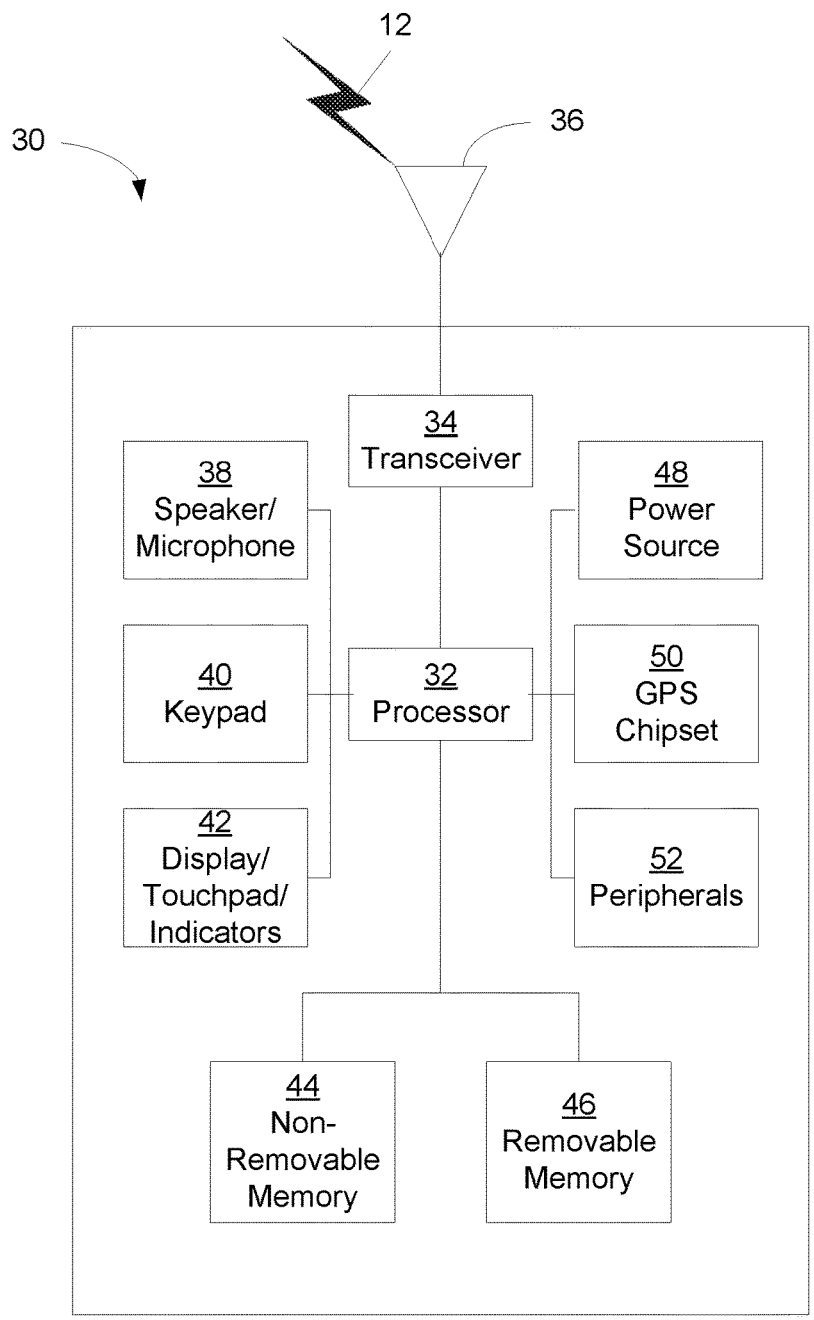
FIG. 15C is a system diagram of an example M2M/IoT terminal or gateway device that may be used within the communications system illustrated in FIG. 15A.
Figure 15D:
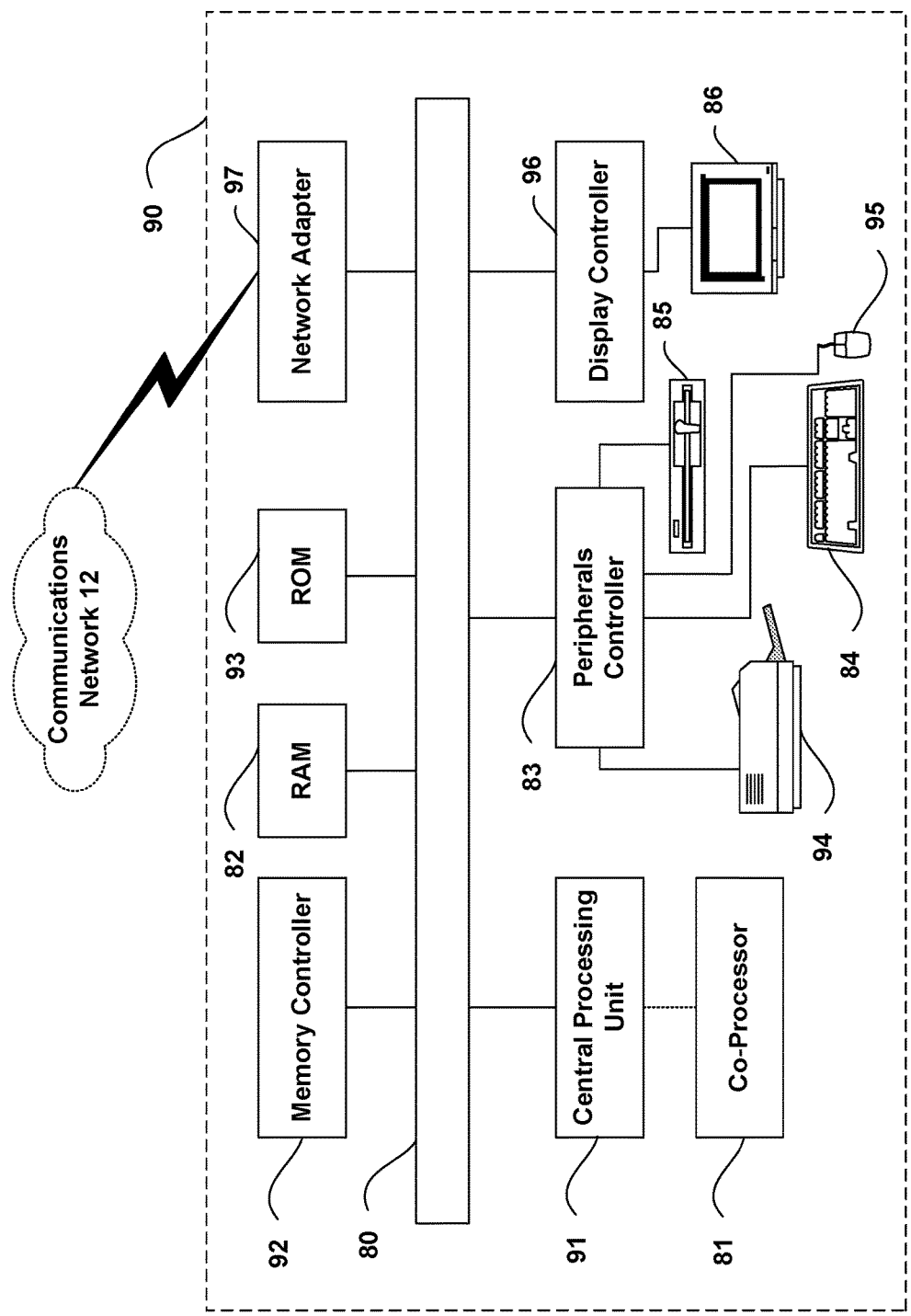
FIG. 15D is a block diagram of an example computing system in which aspects of the communication system of FIG. 15A may be embodied.

It is understood that the entities performing the steps illustrated in FIG. 4-FIG. 7 and FIG. 9-FIG. 10 are logical entities that may be implemented in the form of software (e.g., computer-executable instructions) stored in a memory of, and executing on a processor of, a device, server, or computer system such as those illustrated in FIG. 15C or FIG. 15D. That is, the method(s) illustrated in FIG. 4-FIG. 7 and FIG. 9-FIG. 10 may be implemented in the form of software (i.e., computer-executable instructions) stored in a memory of a computing device, such as the device or computer system illustrated in FIG. 15C or FIG. 15D, which computer executable instructions, when executed by a processor of the computing device, perform the steps illustrated in FIG. 4-FIG. 7 and FIG. 9-FIG. 10. In an example, with further detail below with regard to the interaction of M2M devices, IoT device 138 of FIG. 5 may reside on M2M terminal device 18 of FIG. 15A, while CAPA 134 and proximity manager 137 of FIG. 5 may reside on M2M gateway device 14 of FIG. 15A.

FIG. 15A is a diagram of an example machine-to machine (M2M), Internet of Things (IoT), or Web of Things (WoT) communication system 10 in which one or more disclosed concepts may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 15A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 15A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 15B, the illustrated M2M service layer 22 (e.g., CSE 240 described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 15B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using CAPA, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The context-aware and proximity-aware service layer connectivity management (CAPA) of the present application may be implemented as part of a service layer. The service layer (e.g., CSE 240) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain CAPA of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, CAPA of the present application can be implemented as part of an M2M network that uses a Service Oriented Architecture (SOA) and/or a resource-oriented architecture (ROA) to access services such as the CAPA of the present application.

FIG. 15C is a system diagram of an example M2M device 30, such as an M2M terminal device 18 or an M2M gateway device 14 for example. As shown in FIG. 15C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (IoT device 138, IoT device 139, IoT server 136, IoT server 245, IoT gateway 265, and others) may be a device that uses the disclosed systems and methods for CAPA.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 15C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 15C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether CAPA steps or processes in some of the examples described herein are successful or unsuccessful (e.g., success of connection establishment 141, connection adjustment 143, and connection cancellation 145), or otherwise indicate a status of CAPA and associated components. The control lighting patterns, images, or colors on the display or indicators 42 may be reflective of the status of any of the method flows or components in the FIG.'s illustrated or discussed herein. Disclosed herein are messages and procedures of CAPA.

The messages and procedures can be extended to provide interface/API for users to request CAPA-related resources or execution of methods via an input source (e.g., speaker/microphone 38, keypad 40, or display/touchpad 42) and request, configure, or query CAPA, among other things that may be displayed on display 42.

CAPA 134 may maintain a service layer overlay topology for all IoT entities it manages and present the topologies on display 42. The topology may display multiple network entities (IoT entities and non-IoT entities) and how service layers may communicate through them. The displayed topology may be similar to FIG. 2 and FIG. 3 or include more detail with regard to the Types and entities using the service layer. An M2M/IoT device/gateway may have a user interface (e.g., speaker/microphone 38, keypad 40, or display/touchpad 42) for users to leverage CAPA functions. This interface may provide buttons, windows, or other graphical user interface displayed, e.g., on the display/touchpad 42 allowing a user to activate or deactivate some functionalities introduced by the invention as discussed below. There may be a button or similar function to allow users to actively trigger "connection establishment request." There may be a button or similar function to allow users to actively trigger "connection adjustment request." There may be a button or similar function to allow users to actively trigger "connection cancellation request." There may be a button or similar function to allow users to report entity context information, proximity context information, concurrent connectivity context information, network context information, etc. There may be a window or similar function to allow users to configure or receive connectivity policies. There may be a window or similar function to display the available connections. There may be a window or similar function to display the current connection being used. There may be a window or similar function to maintain all connections used in the past.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 15D is a block diagram of an exemplary computing system 90 on which, for example, the M2M service platform 22 of FIG. 15A and FIG. 15B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for CAPA.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 15A and FIG. 15B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples (e.g., skipping, combining, or adding steps to example methods) that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide means for context-aware and proximity-aware service layer connectivity management. A method, system, computer readable storage medium, or apparatus includes means for receiving a request to establish a service layer connection with a first machine-to-machine entity; responsive to the request to establish the service layer connection with the first machine-to-machine entity, retrieving context information of the first machine-to-machine entity; and determining a communication path for the service layer connection between the first machine-to-machine entity and a second machine-to-machine entity based on the context information of the first machine-to-machine entity. The method, system, computer readable storage medium, or apparatus may include means for notifying the first machine-to-machine entity of an established communication path based on the determining of the communication path. The method, system, computer readable storage medium, or apparatus may include means for notifying the first-machine-to-machine entity of properties an established communication path based on the determining of the communication path. The method, system, computer readable storage medium, or apparatus may have properties of the established communication path that include information about any intermediary link layer entity used for providing the established communication path. The properties of the established communication path may include information about any intermediary service layer entity used for providing the established communication path providing service layer connectivity. The context information may include a preference of the first-machine-to-machine entity in connectivity as a source entity. The context information may include context information of an application that is scheduled to use the communication path. The context information may include information about whether data of an application scheduled to use the communication path is cacheable. The method, system, computer readable storage medium, or apparatus may include means for notifying the first machine-to-machine entity of the determined communication path, the determined communication path a direct link layer link between the first machine-to-machine entity and the second machine-to-machine entity. All combinations in this paragraph (including the removal or addition of steps) are contemplated in a manner that is consistent with the other portions of the detail description.

What is claimed:

1. A machine-to-machine server for connectivity management, the server comprising:
   a processor; and
   a memory coupled with the processor, the memory comprising executable instructions that when executed by the processor cause the processor to effectuate operations comprising:
      receiving a request to establish a service layer connection with a first machine-to-machine entity;
      responsive to the request to establish the service layer connection with the first machine-to-machine entity, retrieving context information of the first machine-to-machine entity, wherein the context information comprises the speed and direction of the first machine-to-machine entity; and
      determining a communication path for the service layer connection between the first machine-to-machine entity and a second machine-to-machine entity based on the context information of the first machine-to-machine entity, wherein the communication path is a direct link between the first and second machine-to-machine entities.

2. The machine-to-machine server of claim 1, further operations comprising notifying the first machine-to-machine entity of an established communication path based on the determining of the communication path.

3. The machine-to-machine server of claim 1, further operations comprising notifying the first-machine-to-machine entity of properties an established communication path based on the determining of the communication path.

4. The machine-to-machine server of claim 1, wherein the context information comprises a preference of the first-machine-to-machine entity in connectivity as a source entity.

5. The machine-to-machine server of claim 1, wherein the context information comprises context information of an application that is scheduled to use the communication path.

6. The machine-to-machine server of claim 1, wherein the context information comprises information about whether data of an application scheduled to use the communication path is cacheable.

7. The machine-to-machine server of claim 1, further operations comprising notifying the first machine-to-machine entity of the determined communication path.

8. A method for connectivity management of a service layer communication, the method comprising:
   receiving a request to establish a service layer connection with a first machine-to-machine entity;
   responsive to the request to establish the service layer connection with the first machine-to-machine entity, retrieving context information, wherein the context information comprises the speed or direction of the first machine-to-machine entity; and determining a communication path for the service layer connection between the first machine-to-machine entity and a second machine-to-machine entity based on the context information, wherein the communication path is a direct link between the first and second machine-to-machine entities.

9. The method of claim 8, further comprising notifying the first machine-to-machine entity of an established communication path based on the determining of the communication path.

10. The method of claim 8, further comprising notifying the first-machine-to-machine entity of properties an established communication path based on the determining of the communication path.

11. The method of claim 8, wherein the context information comprises a preference of the first-machine-to-machine entity in connectivity as a source entity.

12. The method of claim 8, wherein the context information comprises context information of an application that is scheduled to use the communication path.

13. The method of claim 8, wherein the context information comprises information about whether data of an application scheduled to use the communication path is cacheable.

14. The method of claim 8, further comprising notifying the first machine-to-machine entity of the determined communication path.

15. A computer readable storage medium storing computer executable instructions that when executed by a computing device cause said computing device to effectuate operations comprising:

receiving a request to establish a service layer connection with a first machine-to-machine entity;

responsive to the request to establish the service layer connection with the first machine-to-machine entity, retrieving context information of the first machine-to-machine entity, wherein the context information comprises the speed and direction of the first machine-to-machine entity; and determining a communication path for the service layer connection between the first machine-to-machine entity and a second machine-to-machine entity based on the context information of the first machine-to-machine entity, wherein the communication path is a direct link between the first and second machine-to-machine entities.

16. The computer readable storage medium of claim 15, further operations comprising notifying the first machine-to-machine entity of an established communication path based on the determining of the communication path.

* * * * *